(12) United States Patent
Kobayashi et al.

(10) Patent No.: US 9,532,028 B2
(45) Date of Patent: Dec. 27, 2016

(54) IMAGE PROCESSING DEVICE, AND IMAGE PROCESSING METHOD, AND PROGRAM

(75) Inventors: Seiji Kobayashi, Tokyo (JP); Atsushi Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 318 days.

(21) Appl. No.: 14/233,195

(22) PCT Filed: Jun. 21, 2012

(86) PCT No.: PCT/JP2012/065826
§ 371 (c)(1),
(2), (4) Date: Jan. 16, 2014

(87) PCT Pub. No.: WO2013/018451
PCT Pub. Date: Feb. 7, 2013

(65) Prior Publication Data
US 2014/0218486 A1 Aug. 7, 2014

(30) Foreign Application Priority Data
Aug. 4, 2011 (JP) ................................ 2011-171038

(51) Int. Cl.
*H04N 13/02* (2006.01)
*G03B 35/10* (2006.01)
(Continued)

(52) U.S. Cl.
CPC ........ *H04N 13/0207* (2013.01); *G02B 5/3058* (2013.01); *G02B 27/26* (2013.01);
(Continued)

(58) Field of Classification Search
CPC ............................................... H04N 13/0207
(Continued)

(56) References Cited

U.S. PATENT DOCUMENTS

2005/0089212 A1* 4/2005 Mashitani .......... H04N 13/0296
382/154
2010/0321777 A1* 12/2010 Martinez ................ G02B 27/26
359/465

FOREIGN PATENT DOCUMENTS

JP 06-054991 7/1994
JP 2004-228629 8/2004
(Continued)

*Primary Examiner* — Yulin Sun
(74) *Attorney, Agent, or Firm* — Chip Law Group

(57) ABSTRACT

A plurality of viewpoint images are acquired and images for three-dimensional image display are generated without causing a reduction in polarization performance. Provided are: a first polarization means which has a first polarization region and a second polarization region that each allows different polarized light to be transmitted therethrough; a second polarization means which is made up of a third polarization region that allows only the transmitted light of either one of the first polarization region or the second polarization region to be transmitted therethrough, and a total transmission region that allows the transmitted light of the first polarization region and the second polarization region to be transmitted therethrough; an imaging element into which the transmitted light of the second polarization means is input; and an image processing unit which executes signal processing for an output signal of the imaging element. The image processing unit generates parallax information in which subject distance is reflected by applying a first viewpoint image that is based on the transmitted light of the total transmission region of the second polarization means, and a second viewpoint image that is based on the transmitted light of the third polarization region of the second polarization means, and generates a left-eye-purpose image and a right-eye-purpose image for three-dimensional image display by means of image conversion processing of (Continued)

the first viewpoint image for which the parallax information is applied.

14 Claims, 24 Drawing Sheets

(51) Int. Cl.
*G02B 27/26* (2006.01)
*H04N 13/00* (2006.01)
*G02B 5/30* (2006.01)

(52) U.S. Cl.
CPC ......... *G03B 35/10* (2013.01); *H04N 13/0011* (2013.01); *H04N 13/026* (2013.01); *H04N 13/0217* (2013.01); *H04N 13/0257* (2013.01); *H04N 13/0271* (2013.01)

(58) Field of Classification Search
USPC .......................................................... 348/49
See application file for complete search history.

(56) References Cited

FOREIGN PATENT DOCUMENTS

| | | |
|---|---|---|
| JP | 2004-309868 | 11/2004 |
| JP | 2011-035853 | 2/2011 |
| WO | WO 2009/147814 | 12/2009 |

\* cited by examiner

FIG. 12
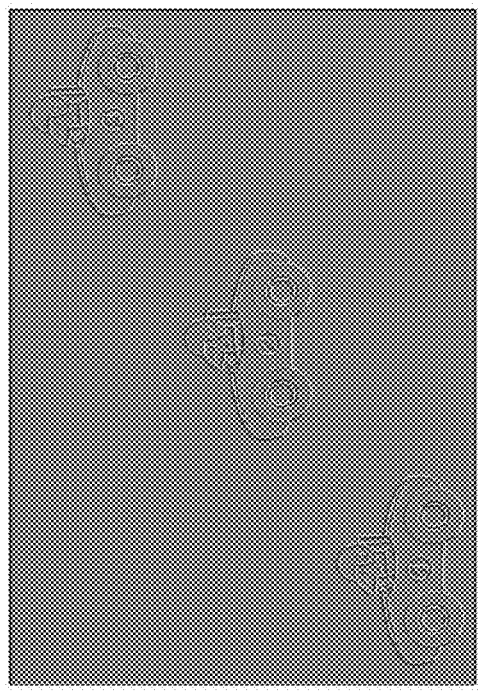
(a) INPUT SIGNAL
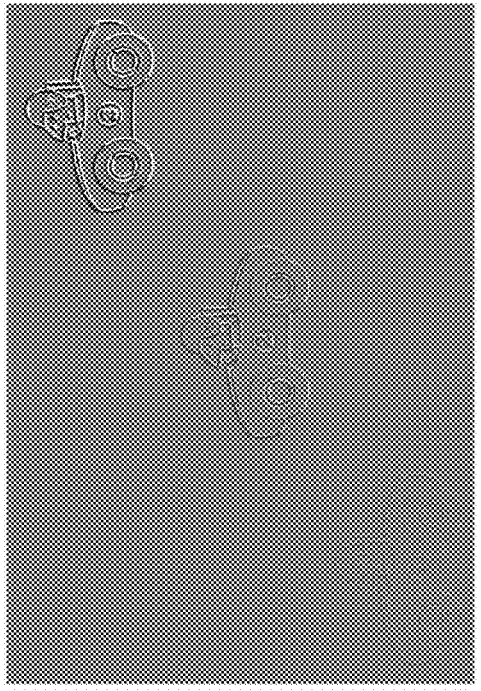
(b) DIFFERENTIAL SIGNAL
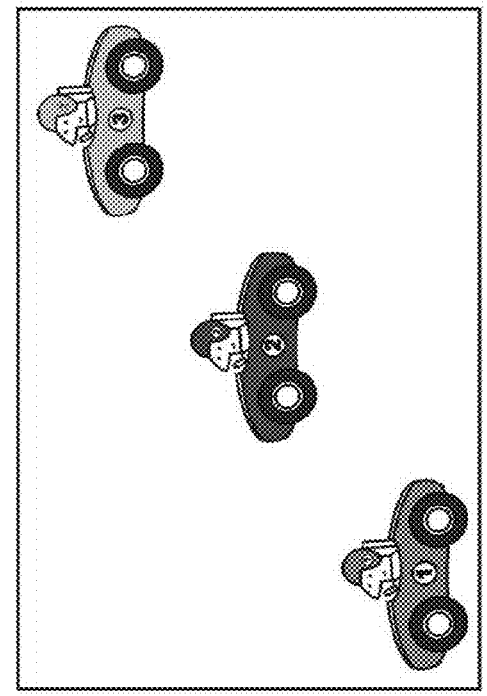
(c) DEPTH INFORMATION
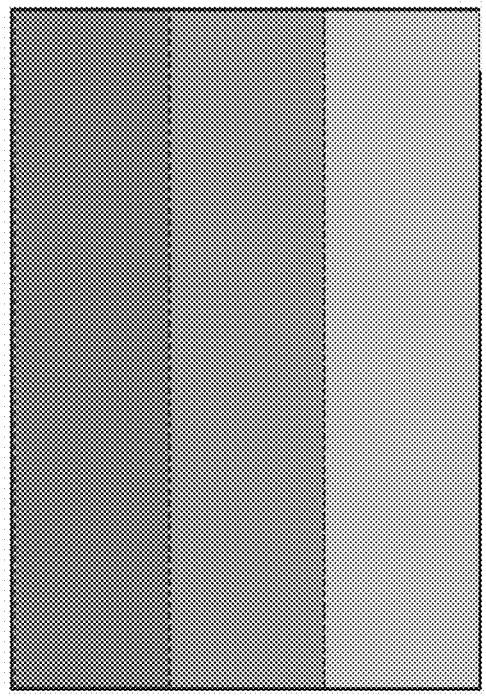
(d) POST-CORRECTION DIFFERENTIAL SIGNAL

FIG. 21

BRIGHTNESS IS LOW SINCE THE AMOUNT OF RECEIVED LIGHT IS SMALL.

THERE ARE THREE TYPES OF PIXELS OF {G, B, R} ACCORDING TO COLOR FOR NON-POLARIZATION PIXELS (N PIXELS) AND POLARIZATION PIXELS (PL PIXELS).

ALTERNATIVELY, THERE ARE FOUR TYPES OF PIXELS OF {Gr, Gb, B, R} FOR WHICH G PIXELS ARE DISTINGUISHED BY BEING ADJACENT TO AN R PIXEL OR BEING ADJACENT TO A B PIXEL. THE AVERAGES AND STANDARD DEVIATIONS ACROSS THE WHOLE IMAGE ARE OBTAINED FOR THESE PIXELS.

TO BE SPECIFIC, THE AVERAGES AND STANDARD DEVIATIONS FOR EACH OF (1) NGr, (2) NGb, (3) NB, (4) NR, (5) PLGr, (6) PLGb, (7) PLB, AND (8) PLR ARE OBTAINED.

NORMALIZATION IS CARRIED OUT IN SUCH A WAY THAT THE AVERAGES AND STANDARD DEVIATIONS OF THE N PIXEL COLORS ARE THE SAME AMONG EACH OF (5) AND (1), (6) AND (2), (7) AND (3), AND (8) AND (4).

PL PIXELS

HORIZONTAL POLARIZATION REGION 15H

TOTAL TRANSMISSION (NON-POLARIZATION) REGION 15A

N PIXELS

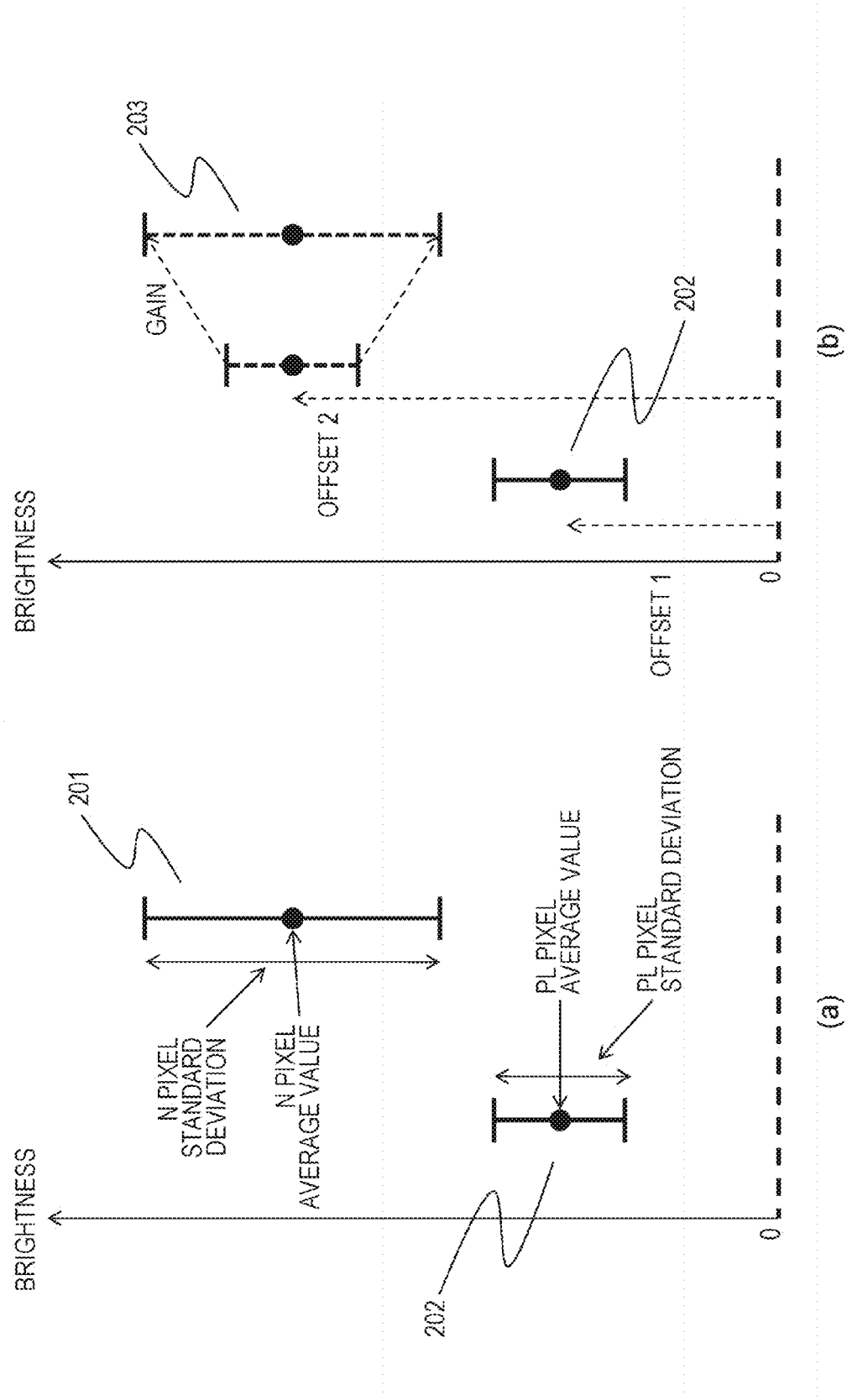

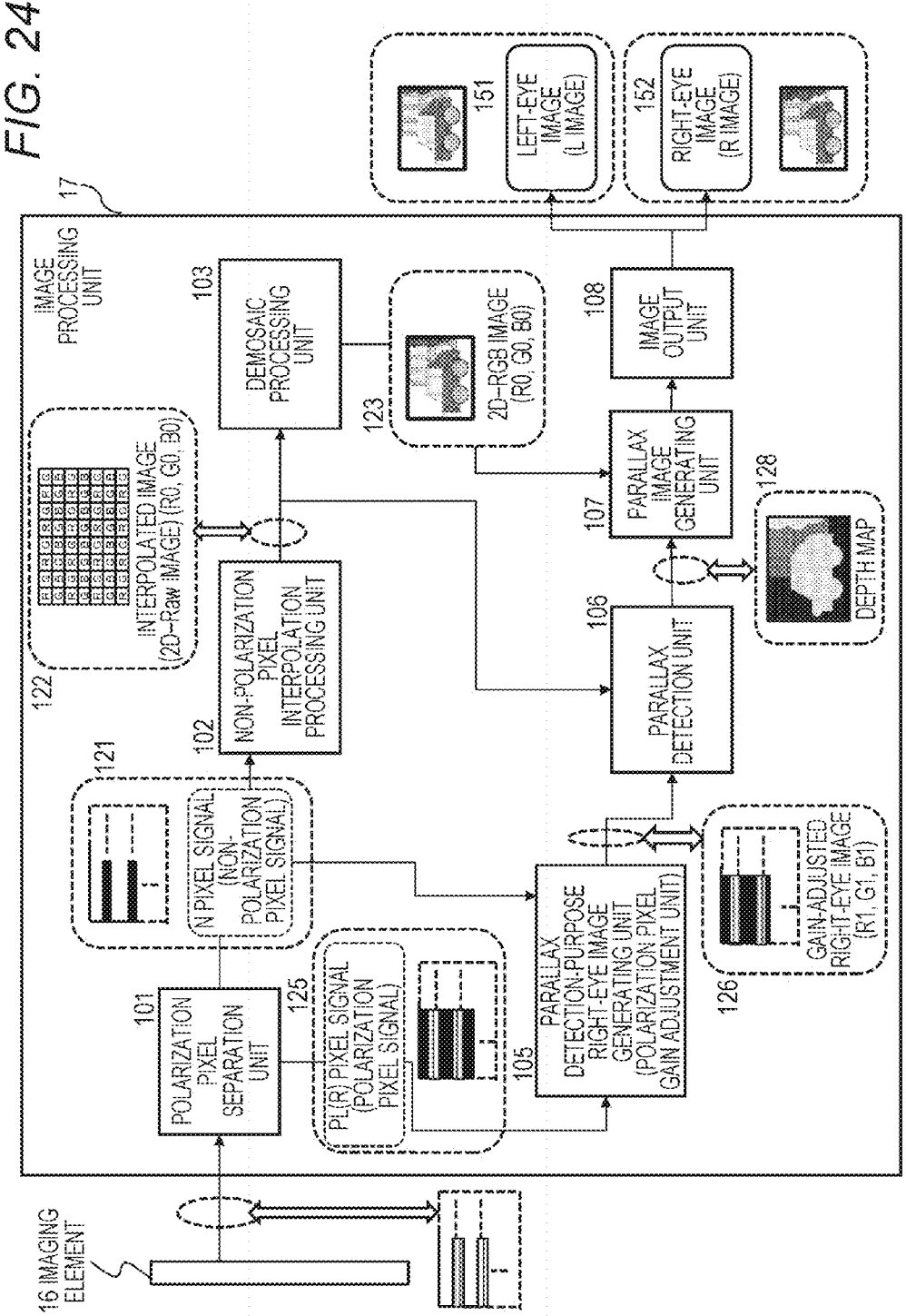

IMAGE PROCESSING DEVICE, AND IMAGE PROCESSING METHOD, AND PROGRAM

TECHNICAL FIELD

The present disclosure relates to an image processing device, and an image processing method, and a program. In more detail, the present disclosure relates to an image processing device, and an image processing method, and a program with which generation processing and so on of three-dimensional images (3D images) that can be stereoscopically viewed (stereoscopic vision) is carried out.

BACKGROUND ART

An image compatible with stereoscopic viewing (stereoscopic vision) that can be viewed as a stereoscopic image having depth is configured by combining the two images of a left-eye-purpose image and a right-eye-purpose image, which are images from different viewpoints. In order to obtain an image from these two viewpoints, in other words a binocular parallax image, for example, two imaging devices are arranged apart from each other to the left and to the right and capture images.

A pair of captured stereoscopic images are configured of the pair of images of: a left-eye-purpose image that is captured by the left-side imaging device and is observed by the left eye; and a right-eye-purpose image that is captured by the right-side imaging device and is observed by the right eye.

The stereoscopic image pair configured of the pair of the left-eye-purpose image and the right-eye-purpose image is displayed on a display device that can separate and present the left-eye-purpose image and the right-eye-purpose image respectively to the left eye and the right eye of an observer, and the observer is thereby able to perceive the images as a stereoscopic image.

However, in the case where two cameras are used to carry out photographing in order to capture these images from two different viewpoints, precise synchronization control of the two cameras is required which is extremely difficult, and accurate control of the convergence angle is also extremely difficult.

A stereoscopic imaging device in which an optical system is shared by combining light-polarizing polarization filters in such a way as to have a mutually orthogonal relationship in order to facilitate the adjustment of the lens system for carrying out stereoscopic imaging is disclosed in Patent Document 1 (JP 6-054991 B) for example.

Furthermore, a method for carrying out stereoscopic imaging with an imaging device configured from two lenses and one imaging means is disclosed in, for example, Patent Document 2 (JP 2004-309868 A). The imaging device disclosed in this Patent Document 2 constitutes a configuration in which (a) a combination configuration of a lens and a horizontal component polarization filter, and (b) a combination configuration of a lens and a vertical component polarization filter are each set to locations that are set apart from an imaging surface of a CCD by a predetermined distance, and are set apart from each other by a space corresponding to the parallax of a human being, and these two combination configurations of (a) and (b) are used to acquire a left-eye image and a right-eye image.

CITATION LIST

Patent Documents

Patent Document 1: JP 6-054991 B
Patent Document 2: JP 2004-309868 A

SUMMARY OF THE INVENTION

Problems to be Solved by the Invention

Incidentally, in the technology disclosed in the above-mentioned Patent Document 1 (JP 6-054991 B), a lens system is shared by the output from two polarization filters being superimposed such that the optical paths constitute one system.

However, it is necessary to additionally provide polarization filters in order to extract a right-eye-purpose image and a left-eye-purpose image at a later stage, and to cause light to be incident on each polarization filter by dividing the optical paths themselves once more, and there are problems such as a loss of light occurring in the lens system, and it being difficult to make the device smaller in size.

Furthermore, in the technology disclosed in the above-mentioned Patent Document 2 (JP 2004-309868 A), it is necessary for the combination of the lenses and the polarization filters to be in two sets, and it is inevitable that the device becomes more complex and larger in size.

The present disclosure takes the abovementioned problems for example into consideration, and an objective thereof is to provide an image processing device, and an image processing method, and a program with which images that can be observed as stereoscopic images are generated by executing processing for images captured by one imaging device.

Solutions to Problems

A first aspect of the present disclosure is in an image processing device including:
a first polarization means which has a first polarization region and a second polarization region that each allows different polarized light to be transmitted therethrough;
a second polarization means into which the transmitted light of the first polarization means enters, and which is made up of a third polarization region that allows only the transmitted light of either one of the first polarization region or the second polarization region to be transmitted therethrough, and a total transmission region that allows the transmitted light of the first polarization region and the second polarization region to be transmitted therethrough;
an imaging element into which the transmitted light of the second polarization means is input; and
an image processing unit which executes signal processing for an output signal of the imaging element,
wherein the image processing unit generates parallax information in which subject distance is reflected by applying a first viewpoint image that is based on the transmitted light of the total transmission region of the second polarization means, and a second viewpoint image that is based on the transmitted light of the third polarization region of the second polarization means, and generates a left-eye-purpose image and a right-eye-purpose image for three-dimensional image display by means of image conversion processing of the first viewpoint image for which the parallax information is applied.

In addition, in one embodiment of the image processing device of the present disclosure, the first viewpoint image that is based on the transmitted light of the total transmission region of the second polarization means is a normal image in which the center location of the first polarization means serves as the viewpoint, the second viewpoint image that is based on the transmitted light of the third polarization region of the second polarization means is a right-eye-purpose image or a left-eye-purpose image in which either one of the gravity center locations of the first polarization region or the second polarization region of the first polarization means serves as the viewpoint, and the image processing unit applies the normal image that is the first viewpoint image and the viewpoint image of either the right-eye-purpose image or the left-eye-purpose image that is the second viewpoint image to generate a left-eye-purpose image or a right-eye-purpose image as a third viewpoint image that is different from the second viewpoint image, and applies the second viewpoint image and the third viewpoint image to generate the parallax information.

In addition, in one embodiment of the image processing device of the present disclosure, the image processing unit generates a left-eye-purpose image or a right-eye-purpose image as a third viewpoint image that is different from the second viewpoint image, by means of processing in which a pixel value of the right-eye-purpose image or the left-eye-purpose image that is the second viewpoint image is subtracted from a pixel value of the normal image that is the first viewpoint image.

In addition, in one embodiment of the image processing device of the present disclosure, the parallax information generated by the image processing unit is a depth map in which the subject distance information of an image is reflected, and the image processing unit generates a left-eye-purpose image and a right-eye-purpose image for three-dimensional image display by means of the image conversion processing of the first viewpoint image in which the depth map is applied.

In addition, in one embodiment of the image processing device of the present disclosure, the third polarization region and the total transmission region of the second polarization means are configurations that are repeatedly set in multiple-pixel units in a first direction that is one direction of an imaging element plane.

In addition, in one embodiment of the image processing device of the present disclosure, the third polarization region of the second polarization means is configured of a wire grid polarizer, and is a configuration having wires that extend in a second direction perpendicular to the first direction of the imaging element.

In addition, in one embodiment of the image processing device of the present disclosure, the image processing unit executes brightness adjustment with which the brightness level of the viewpoint image of either the right-eye-purpose image or the left-eye-purpose image that is the second viewpoint image that is based on the transmitted light of the third polarization region of the second polarization means is made to match the brightness level of the first viewpoint image that is based on the transmitted light of the total transmission region of the second polarization means, and applies the second viewpoint image subsequent to the brightness adjustment to generate the parallax information.

In addition, in one embodiment of the image processing device of the present disclosure, the image processing unit includes: an interpolation processing unit which interpolates pixel values of pixel locations corresponding to the third polarization region that are not included in an image that is based on imaging element output from the pixel locations of the imaging element corresponding to the total transmission region of the second polarization means; and a demosaic processing unit which sets pixel values for colors to pixel locations by means of demosaic processing of an interpolated image generated by the interpolation processing unit and generates the first viewpoint image, and the image processing unit executes the image conversion processing in which the parallax information is applied, with respect to the first viewpoint image generated by the demosaic processing unit, and generates a left-eye-purpose image and a right-eye-purpose image for three-dimensional image display.

In addition, in one embodiment of the image processing device of the present disclosure, the image conversion processing executed by the image processing unit is 2D/3D conversion processing with which a left-eye-purpose image and a right-eye-purpose image for three-dimensional image display are generated by means of image conversion processing in which the parallax information is applied with respect to the first viewpoint image, which is a two-dimensional (2D) image.

In addition, in one embodiment of the image processing device of the present disclosure, the image conversion processing executed by the image processing unit and in which the parallax information is applied is 2D/3D conversion processing with which a left-eye-purpose image and a right-eye-purpose image for three-dimensional image display are generated by carrying out image shift processing corresponding to subject distance with respect to the first viewpoint image.

In addition, a second aspect of the present disclosure is in an image processing device which executes image processing for an image captured by an imaging means, wherein the imaging means is a configuration which captures an image that is based on the transmitted light of a first polarization means that has a first polarization region and a second polarization region that each allows different polarized light to be transmitted therethrough, and the image processing device inputs a first viewpoint image made up of all of the transmitted light of the first polarization region and the second polarization region, and a second viewpoint image made up of only the transmitted light of either one of the first polarization region or the second polarization region, generates parallax information in which subject distance is reflected by applying the first viewpoint image and the second viewpoint image, and generates a left-eye-purpose image and a right-eye-purpose image for three-dimensional image display by means of image conversion processing of the first viewpoint image for which the parallax information is applied.

In addition, a third aspect of the present disclosure is in an image processing device including:

a first polarization means which has a first polarization region and a second polarization region that each allows different polarized light to be transmitted therethrough;

a second polarization means into which the transmitted light of the first polarization means enters, and which is made up of a third polarization region that allows only the transmitted light of the first polarization region to be transmitted therethrough, a fourth polarization region that allows only the transmitted light of the second polarization region to be transmitted therethrough, and a total transmission region that allows the transmitted light of the first polarization region and the second polarization region to be transmitted therethrough;

an imaging element into which the transmitted light of the second polarization means is input; and an image processing unit which executes signal processing for an output signal of the imaging element, wherein the image processing unit applies a viewpoint image that is based on the transmitted light of the third transmission region of the second polarization means, and a viewpoint image that is based on the transmitted light of the fourth polarization region to generate parallax information in which subject distance is reflected, and applies the parallax information to generate a left-eye-purpose image and a right-eye-purpose image for three-dimensional image display by means of image conversion processing of a viewpoint image that is based on the transmitted light of the total transmission region of the second polarization means.

In addition, a fourth aspect of the present disclosure is in an image processing method for executing, in an image processing device, image processing for an image captured by an imaging means, wherein the imaging means is a configuration which captures an image that is based on the transmitted light of a first polarization means that has a first polarization region and a second polarization region that each allows different polarized light to be transmitted therethrough, and in the image processing method, in an image processing unit, a first viewpoint image made up of all of the transmitted light of the first polarization region and the second polarization region, and a second viewpoint image made up of only the transmitted light of either one of the first polarization region or the second polarization region are input, parallax information in which subject distance is reflected by applying the first viewpoint image and the second viewpoint image is generated, and a left-eye-purpose image and a right-eye-purpose image for three-dimensional image display are generated by means of image conversion processing of the first viewpoint image for which the parallax information is applied.

In addition, a fifth aspect of the present disclosure is in a program that causes image processing for an image captured by an imaging means to be executed in an image processing device, wherein the imaging means is a configuration which captures an image that is based on the transmitted light of a first polarization means that has a first polarization region and a second polarization region that each allows different polarized light to be transmitted therethrough, and the program causes, in an image processing unit, a first viewpoint image made up of all of the transmitted light of the first polarization region and the second polarization region, and a second viewpoint image made up of only the transmitted light of either one of the first polarization region or the second polarization region to be input, parallax information in which subject distance is reflected by applying the first viewpoint image and the second viewpoint image to be generated, and a left-eye-purpose image and a right-eye-purpose image for three-dimensional image display to be generated by means of image conversion processing of the first viewpoint image for which the parallax information is applied.

It should be noted that the program of the present disclosure is, for example, a program that is provided by means of a storage medium for example to an information processing device or a computer system that is capable of executing various program codes. Processing corresponding to the program is realized by this kind of program being executed by a program execution unit on the information processing device or the computer system.

Other additional objectives, features, and merits of the present disclosure will become apparent through a more detailed explanation based on Embodiments of the present disclosure and the appended drawings described hereafter. It should be noted that, in this description, the system refers to a logical configuration of a set of a plurality of devices, and is not restricted to the constituent devices being in the same enclosure.

Effects of the Invention

According to the configuration of one embodiment of the present disclosure, it is possible to acquire a plurality of viewpoint images and generate images for three-dimensional image display without causing a reduction in polarization performance.

To be specific, provided are: a first polarization means which has a first polarization region and a second polarization region that each allow different polarized light to be transmitted therethrough; a second polarization means which includes a third polarization region that allows only the transmitted light of either one of the first polarization region or the second polarization region to be transmitted therethrough, and a total transmission region that allows the transmitted light of the first polarization region and the second polarization region to be transmitted therethrough; an imaging element into which the transmitted light of the second polarization means is input; and an image processing unit which executes signal processing for an output signal of the imaging element. The image processing unit generates parallax information in which subject distance is reflected by applying a first viewpoint image that is based on the transmitted light of the total transmission region of the second polarization means, and a second viewpoint image that is based on the transmitted light of the third polarization region of the second polarization means, and generates a left-eye-purpose image and a right-eye-purpose image for three-dimensional image display by means of image conversion processing of the first viewpoint image for which the parallax information is applied.

According to the image processing device of one embodiment of the present disclosure, in a camera device that acquires left and right images for each pixel by a polarization filter for separating light being arranged on an aperture surface of an optical system, and a wire grid polarizer being arranged on an image sensor imaging surface, as a result of arranging only a horizontal-direction wire grid polarizer without requiring a vertical-direction wire grid polarizer, it is possible to realize high polarization separation characteristics even with an image sensor having a small pixel size, and it is possible to maintain parallax resolution performance between the left and right images.

BRIEF DESCRIPTION OF DRAWINGS

FIG. 12 is a drawing illustrating an example of processing for controlling the amplitude value of a differential signal in a gain control unit.

FIG. 21 is a drawing illustrating processing executed by a parallax detection-purpose right-eye image generating unit.

FIG. 22 is a drawing illustrating processing executed by a parallax detection-purpose right-eye image generating unit.

FIG. 24 is a drawing illustrating an exemplary configuration of an image processing unit of an image processing device of the present disclosure.

MODE FOR CARRYING OUT THE INVENTION

Hereafter, the details of an image processing device, and an image processing method, and a program of the present invention are described with reference to the drawings. The explanation is given in accordance with the following items.
1. Regarding a configuration and processing example for an image processing device (Embodiment 1)
2. Regarding the characteristics and problems of a wire grid polarizer
3. Regarding an embodiment in which a wire grid polarizer having a short wire length is omitted (Embodiment 2)
4. Regarding an embodiment in which parallax detection is carried out from a right-eye image and a normal image, and a depth map is generated (Embodiment 3)
5. Summary of the configurations of the present disclosure

[1. Regarding a Configuration and Processing Example for an Image Processing Device (Embodiment 1)]

Figure 1:
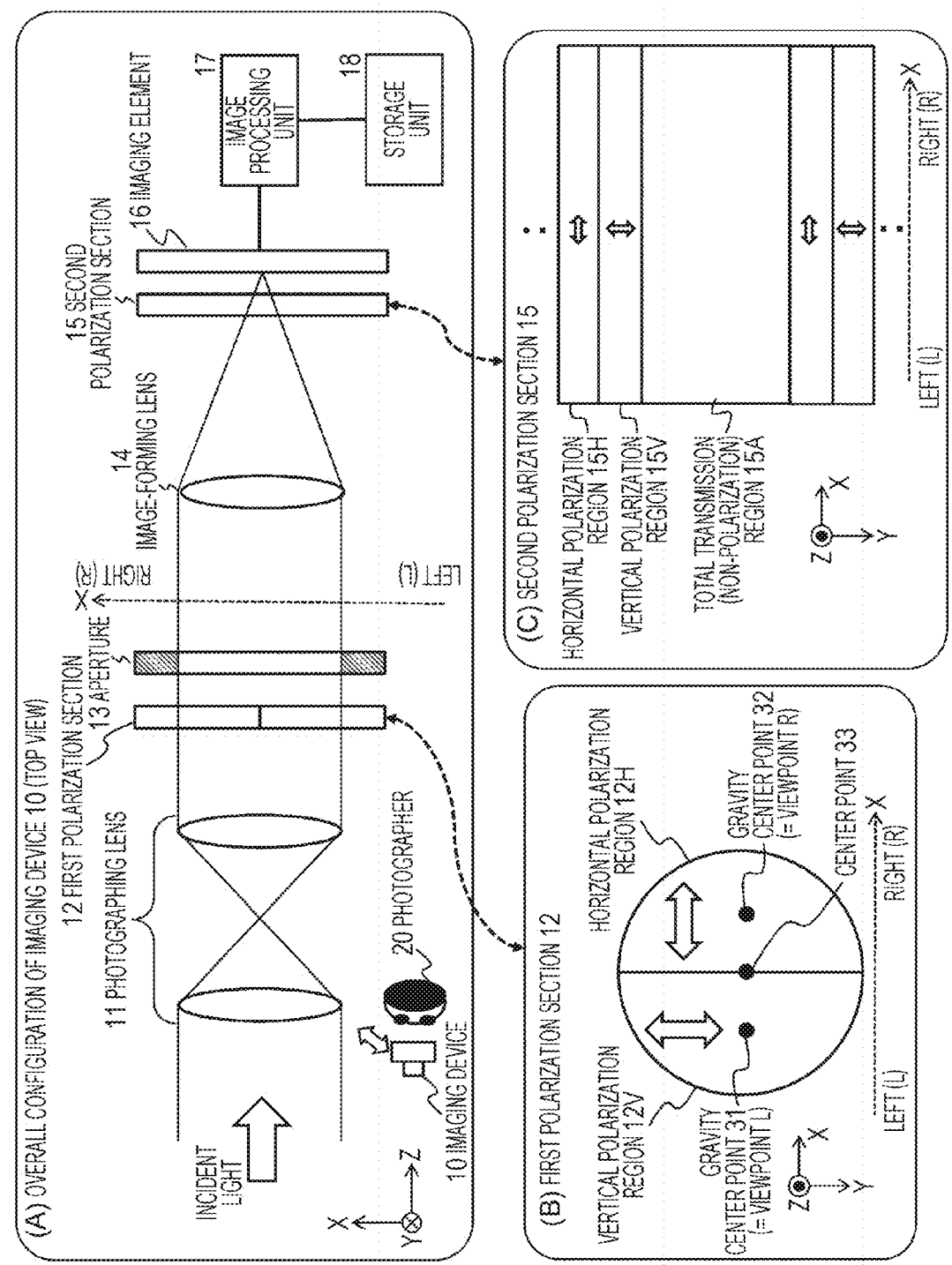
FIG. 1 is a drawing illustrating the overall configuration of an image processing device of the present disclosure.

A configuration and processing example for an image processing device serving as Embodiment 1 of the present disclosure are described with reference to FIG. 1 and thereafter. FIG. 1 depicts the configuration of an imaging device that is an example of an image processing device.

In an imaging device 10 depicted in FIG. 1(A), incident light corresponding to a photographic subject enters via a photographing lens 11.

The incident light that has entered via the photographing lens 11 is input to an imaging element 16 via a first polarization section 12, an aperture 13, an image-forming lens 14, and a second polarization section 15.

It should be noted that FIG. 1(A) is a drawing in which the imaging device (camera) 10 is seen from above, in other words a top view. The schematic diagram of the imaging device 10 and a photographer 20 in the bottom left of FIG. 1(A), and, as indicated by the XYZ coordinate axes, the configuration view of the imaging device of FIG. 1(A) are drawings in which the imaging device (camera) 10 is seen from above.

As indicated by the dotted vertical line (X axis) depicted near the center of FIG. 1(A), the top side of FIG. 1(A) is the right (R) side as seen from the photographer, and the bottom side of FIG. 1(A) is the left (L) side as seen from the photographer.

The imaging element 16 is a photoelectric conversion element such as a CCD or CMOS, and generates an electrical signal corresponding to subject light and outputs the electrical signal to the image processing unit 17.

Signal processing in accordance with a predefined algorithm is executed at the image processing unit 17, and image data serving as the processing result is stored in a storage unit 18.

The details of the configuration and processing of the image processing unit 17 are described hereafter.

In the configuration depicted in FIG. 1(A), the first polarization section 12 has the configuration depicted in FIG. 1(B), and the second polarization section 15 has the configuration depicted in FIG. 1(C).

As depicted in FIG. 1(B), the first polarization section 12 is divided into two regions on the left and right, and is configured from the different polarization regions of a vertical polarization region 12V in the left half region, and a horizontal polarization region 12H in the right half region. It should be noted that these polarization regions are configured using polarization filters for example.

The vertical polarization region 12V allows only vertical-direction polarized light to pass, and light that has passed through the vertical polarization region 12V is vertical-direction polarized light.

The horizontal polarization region 12H allows only horizontal-direction polarized light to pass, and light that has passed through the horizontal polarization region 12H is horizontal-direction polarized light.

The gravity center point 31 depicted in FIG. 1(B) is the gravity center location of the vertical polarization region 12V. The transmitted light of this vertical polarization region 12V corresponds to an image that is observed with the gravity center point 31 as the viewpoint.

Similarly, the gravity center point 32 depicted in FIG. 1(B) is the gravity center location of the horizontal polarization region 12H. The transmitted light of this horizontal polarization region 12H corresponds to an image that is observed with the gravity center point 32 as the viewpoint.

In other words, an image that is observed with the gravity center point 31 that is the gravity center location of the vertical polarization region 12V as the viewpoint corresponds to a left-eye viewpoint image (L image), which is an image observed from the left eye, and an image that is observed with the gravity center point 32 that is the gravity center location of the horizontal polarization region 12H as the viewpoint corresponds to a right-eye viewpoint image (R image), which is an image observed from the right eye.

In this way, for an image that is transmitted through the first polarization section 12, two different left and right viewpoint images are made to be transmitted as vertically polarized light and horizontally polarized light, respectively.

These two different viewpoint images, in other words the light of an L image (vertically polarized light) corresponding to a left-eye-purpose image and an R image (horizontally polarized light) corresponding to a right-eye-purpose image reaches the second polarization section 15 via the image-forming lens 14.

It should be noted that, in the following explanation, a "right-eye-purpose image" and a "left-eye-purpose image" are simplified and written as a "right-eye image" and a "left-eye image", respectively.

The second polarization section 15 has the configuration depicted in FIG. 1(C). As depicted in FIG. 1(C), the second polarization section 15 has a configuration in which the three types of regions of a horizontal polarization region 15H, a vertical polarization region 15V, and a total transmission (non-polarization) region 15A are repeatedly set in this order from the top.

The horizontal polarization region 15H selectively transmits horizontal-direction polarized light and causes an image to be formed by the imaging element 16 from only horizontally polarized light.

The vertical polarization region 15V selectively transmits vertical-direction polarized light and causes an image to be formed by the imaging element 16 from only vertically polarized light.

The total transmission (non-polarization) region 15A transmits all of the horizontal-direction polarized light and vertical-direction polarized light, and causes an image to be formed by the imaging element 16 from all of the incident light.

It should be noted that the polarization regions set in the second polarization section 15 are configured using a wire grid polarizer for example. A wire grid polarizer is a polarization element that has a configuration in which fine wires (Al (aluminum) wire for example) are arranged side by side at small intervals, and exhibits polarization characteristics corresponding to the wire arrangement direction.

Figure 2:
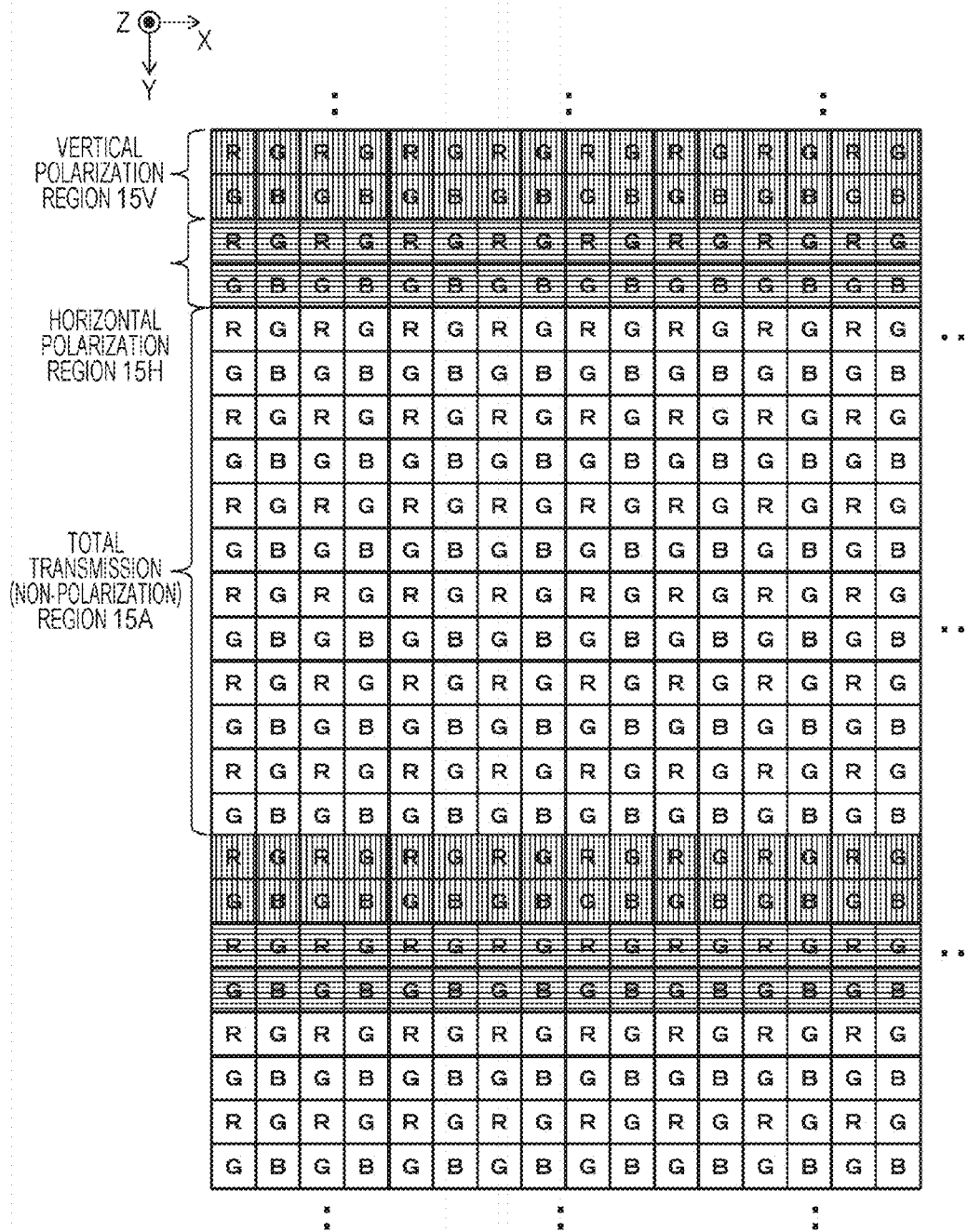
FIG. 2 is a drawing illustrating an exemplary configuration of a second polarization section and an imaging element.

FIG. 2 depicts a drawing in which the second polarization section 15 and the imaging element 16 that receives the transmitted light of the second polarization section 15 are superimposed.

With regard to the imaging element 16, an imaging element having an RGB array (Bayer array) is depicted as an example.

The exemplary configuration depicted in FIG. 2 is an example in which the vertical polarization region 15V and the horizontal polarization region 15H set in the second polarization section 15 are set adjacent to each other in units of two lines of the imaging element, and the total transmission (non-polarization) region 15A is set in units of 12 lines. In other words, these three types of regions of (a) the two-line vertical polarization region 15V, (b) the two-line horizontal polarization region 15H, and (c) the 12-line total transmission (non-polarization) region 15V are repeatedly set in the vertical direction (Y direction) of the imaging element 16.

The horizontal polarization region 15H selectively transmits only horizontal-direction polarized light, in other words an R image (horizontally polarized light) corresponding to a right-eye image transmitted through the horizontal polarization region 12H depicted in FIG. 1(B), and causes a right-eye image (R image) to be formed by the imaging element 16.

The vertical polarization region 15V selectively transmits only vertical-direction polarized light, in other words an L image (vertically polarized light) corresponding to a left-eye image transmitted through the vertical polarization region 12V depicted in FIG. 1(B), and causes a left-eye image (L image) to be formed by the imaging element 16.

The total transmission (non-polarization) region 15A allows transmission of both images of an R image (horizontally polarized light) corresponding to a right-eye image transmitted through the horizontal polarization region 12H depicted in FIG. 1(B), and an L image (vertically polarized light) corresponding to a left-eye image transmitted through the vertical polarization region 12V depicted in FIG. 1(B). These images are images that correspond to an image seen from a center point 33 which is the center location between the gravity center point 31 and the gravity center point 32 depicted in FIG. 1(B). In other words, these images constitute an image that is the same as a normal image captured by a normal monocular camera in which there is no viewpoint deviation caused by the influence of polarization.

The exemplary configuration depicted in FIG. 2 is an exemplary configuration of the second polarization section 15, and is an example in which the vertical polarization region 15V and the horizontal polarization region 15H are set adjacent to each other in units of two lines of the imaging element, and the total transmission (non-polarization) region 15A is set in units of 12 lines.

Various configurations other than this are possible as the configuration of the second polarization section 15.

Figure 3:
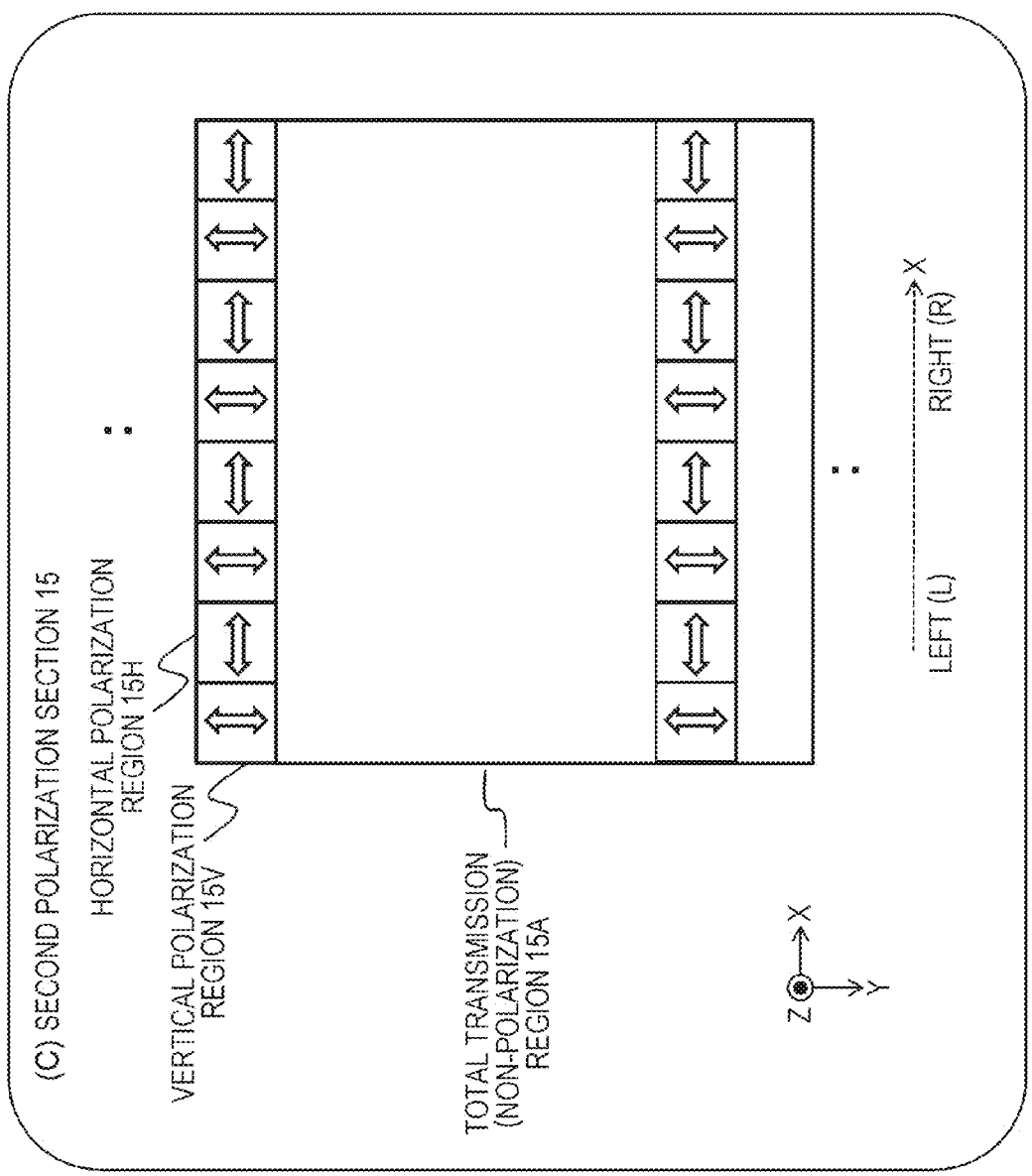
FIG. 3 is a drawing illustrating an exemplary configuration of a second polarization section.

For example, as depicted in FIG. 3, it is also possible to set a configuration in which the vertical polarization region 15V and the horizontal polarization region 15H are each set to rectangular regions, and these are arranged alternately.

Figure 4:
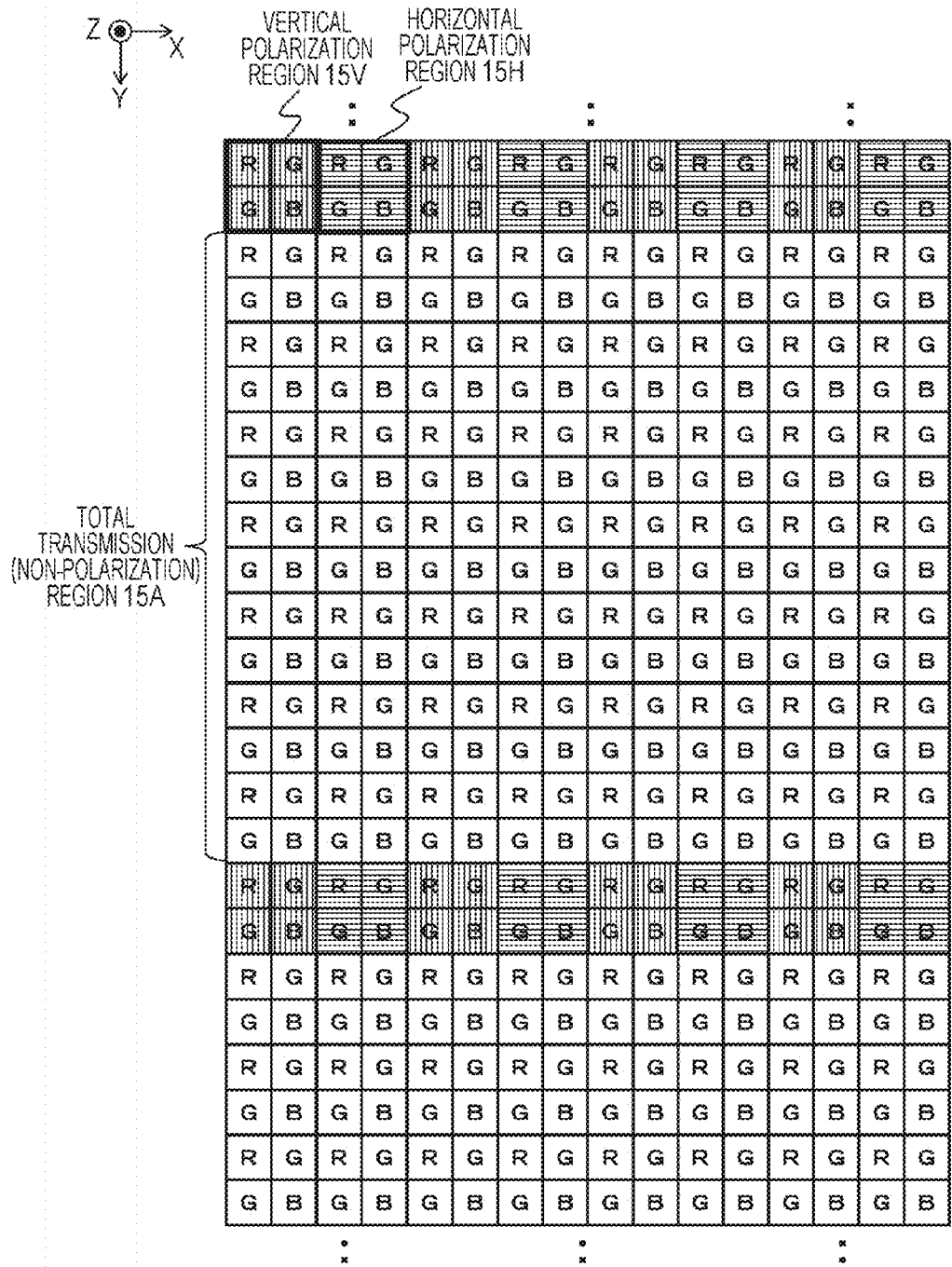
FIG. 4 is a drawing illustrating an exemplary configuration of a second polarization section and an imaging element.

FIG. 4 is a drawing in which the second polarization section depicted in FIG. 3 and the imaging element 16, which has an RGB array, are superimposed and depicted.

The example depicted in FIG. 4 is a configuration in which the vertical polarization region 15V and the horizontal polarization region 15H are set in units of rectangular regions made up of four pixels in a 2×2 arrangement, and a two-row region in which these are alternately arranged and a 14-row total transmission (non-polarization) region 15A are repeatedly arranged in the vertical direction (Y direction).

In the present configuration, the horizontal polarization region 15H made up of rectangular regions of four pixels in a 2×2 arrangement selectively transmits only horizontal-direction polarized light, in other words an R image (horizontally polarized light) corresponding to a right-eye image transmitted through the horizontal polarization region 12H depicted in FIG. 1(B), and causes a right-eye image (R image) to be formed by the imaging element 16.

The vertical polarization region 15V made up of rectangular regions of four pixels in a 2×2 arrangement selectively transmits only vertical-direction polarized light, in other words an L image (vertically polarized light) corresponding to a left-eye image transmitted through the vertical polarization region 12V depicted in FIG. 1(B), and causes a left-eye image (L image) to be formed by the imaging element 16.

The total transmission (non-polarization) region 15A allows transmission of both images of an R image (horizontally polarized light) corresponding to a right-eye image transmitted through the horizontal polarization region 12H depicted in (B), and an L image (vertically polarized light) corresponding to a left-eye image transmitted through the vertical polarization region 12V depicted in FIG. 1(B). These images are images that correspond to an image seen from a center point 33 which is the center location between the gravity center point 31 and the gravity center point 32 depicted in FIG. 1(B). In other words, these images constitute an image which is the same as a normal image that is observed from the center point 33 and has no viewpoint deviation caused by the influence of polarization.

Figure 5:
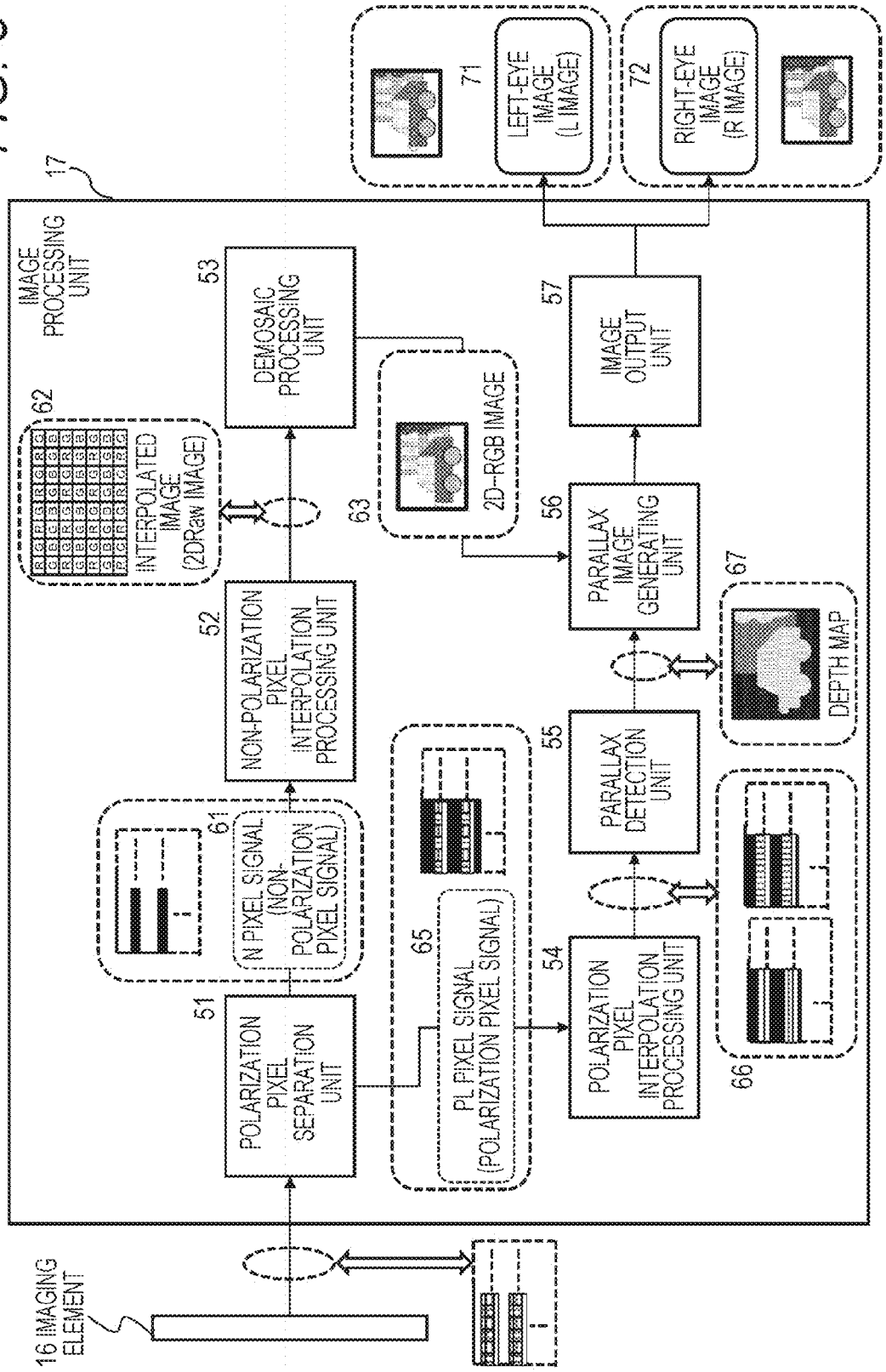
FIG. 5 is a drawing illustrating an exemplary configuration of an image processing unit of an image processing device of the present disclosure.

FIG. 5 is a drawing illustrating a detailed configuration of the image processing unit 17 depicted in FIG. 1.

As described with reference to FIG. 2 to FIG. 4, the imaging element 16 is divided into the three types of regions of (a) a vertical polarization region, (b) a horizontal polarization region, and (c) a total transmission (non-polarization) region, and signals corresponding to each of these regions are input to the image processing unit 17.

It should be noted that, in the following explanation, pixels corresponding to (a) the vertical polarization region and (b) the horizontal polarization region in the imaging element 16 are referred to as PL (polarized) pixels.

Pixels corresponding to (c) the total transmission (non-polarization) region are referred to as N (non-polarized) pixels.

The output of the imaging element 16 is configured of the outputs of the PL pixel output (=output of pixels corresponding to vertical polarization regions and horizontal polarization regions) and the N pixel output (=output of pixels corresponding to total transmission (non-polarization) region).

Here, an explanation is given with respect to a processing example in the case where PL pixel output and N pixel output are output to the image processing unit 17 from the imaging element 16 having the combination configuration of the second polarization section 15 and the imaging element 16 described with reference to FIG. 3 and FIG. 4.

In other words, as described with reference to FIG. 4, the imaging element 16 has a configuration wherein a two-row region, in which vertical polarization regions 15V and horizontal polarization regions 15H are alternately arranged in units of rectangular regions made up of four pixels in a 2×2 arrangement, and a 14-row total transmission (non-polarization) region 15A are repeatedly arranged in the vertical direction (Y direction).

With regard to pixel signals output from the imaging element 16 depicted in FIG. 5, separation processing for the pixel output of the regions of the polarization region pixels (PL pixels) and the non-polarization region pixels (N pixels) is executed in a polarized pixel separation unit 51 of the image processing unit 17.

An N pixel signal (non-polarized pixel signal) 61 separated by means of the separation processing performed by the polarized pixel separation unit 51 is input to a non-polarized pixel interpolation processing unit 52.

The non-polarized pixel interpolation processing unit 52 executes pixel interpolation processing for pixel regions that are missing from the N pixel signal (non-polarized pixel signal) 61, in other words for pixels of a PL pixel region. To be specific, interpolation processing is executed in which, for example, the pixel values of a PL pixel region are calculated and set with reference to the pixel values of N pixels thereabove and therebelow.

By means of this pixel interpolation processing, the pixel values of all of the PL pixel regions having missing pixel values are set, and an interpolated image (2D raw image) 62 having the same number of pixels as the input image is generated. The interpolated image (2D raw image) 62 is an image in which pixel values of any of RGB are set to pixels.

The interpolated image (2D raw image) 62 generated by the non-polarized pixel interpolation processing unit 52 constitutes an image in which N image signals (non-polarization image signals) are set to all of the pixels of the constituent pixels of the imaging element 16. This image is one 2D (two-dimensional) raw image corresponding to an image observed from the center point 33 of the first polarization section 12 depicted in FIG. 1(B).

The interpolated image (2D raw image) 62 generated by the non-polarized pixel interpolation processing unit 52 is input to a demosaic processing unit 53.

The demosaic processing unit 53 carries out demosaic processing for the interpolated image (2D raw image) 62 as well as other camera signal processing, and carries out conversion to a normal two-dimensional image.

The demosaic processing is processing in which in all color signals, pixel values of RGB colors for example, are set in all pixel locations, and is processing which is carried out in a general camera.

A 2D-RGB image 63 generated by the demosaic processing unit 53 is input to a parallax image generating unit 56.

Meanwhile, a PL pixel signal (polarized pixel signal) 65, which is another separated signal generated by means of the separation processing performed by the polarized pixel separation unit 51, constitutes an image signal that does not have pixel values of non-polarization region pixels (N pixels), and is made up of only pixel values of polarization region pixels (PL pixels).

This PL pixel signal (polarized pixel signal) 65 is input to the polarized pixel interpolation processing unit 54.

The processing example described here relates to the configuration described with reference to FIG. 4, wherein a two-row region, in which vertical polarization regions 15V and horizontal polarization regions 15H are alternately arranged in units of rectangular regions made up of four pixels in a 2×2 arrangement, and a 14-row total transmission (non-polarization) region 15A are repeatedly arranged in the vertical direction (Y direction).

Therefore, the PL pixel signal (polarized pixel signal) 65 generated by means of the separation processing performed by the polarized pixel separation unit 51 constitutes an image wherein the two-row region, in which vertical polarization regions 15V and horizontal polarization regions 15H are alternately arranged in units of rectangular regions made up of four pixels in a 2×2 arrangement, is set at intervals of 14 rows in the vertical direction.

Figure 6:
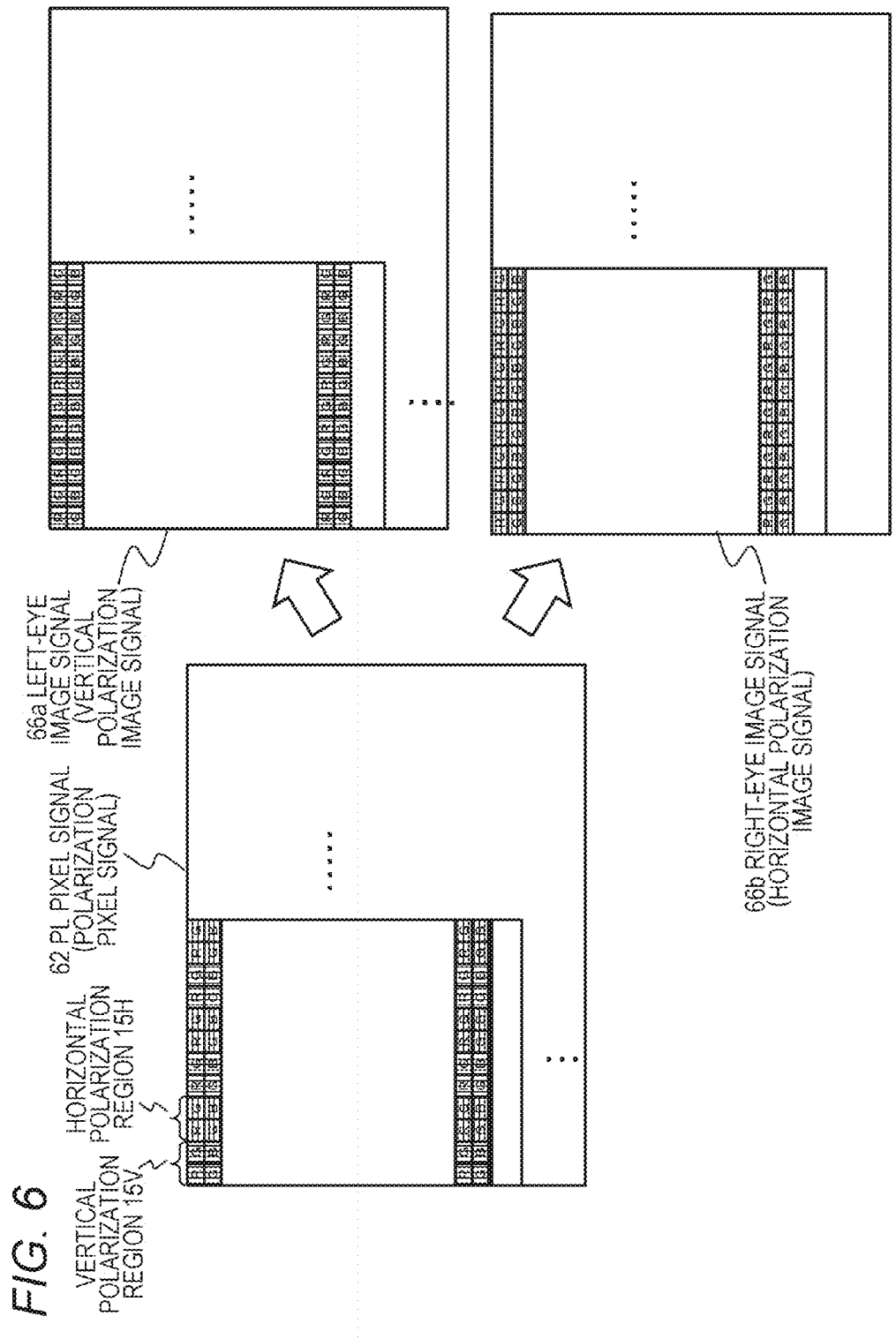
FIG. 6 is a drawing illustrating an example of processing performed by a polarized pixel interpolation processing unit.

The polarized pixel interpolation processing unit 54 selects, as targets for processing, only the two-row regions in which vertical polarization regions 15V and horizontal polarization regions 15H are alternately arranged in units of rectangular regions made up of four pixels in a 2×2 arrangement, and executes the processing depicted in FIG. 6 with respect to these PL pixel regions.

In other words, the polarized pixel interpolation processing unit 54 generates the images of a left-eye image signal (vertically polarized image signal) 66a in which, with respect to PL pixel regions included in the PL pixel signal (polarized pixel signal) 65, all of the pixel values are set as pixel values corresponding to the vertical polarization region 15V, and a right-eye image signal (horizontally polarized image signal) 66b in which all of the pixel values are set as pixel values corresponding to the horizontal polarization region 15H.

It should be noted that the left-eye image signal (vertically polarized image signal) 66a depicted in FIG. 6 is generated by means of pixel value interpolation processing in which the pixel values of horizontally polarized pixel regions of the PL pixel regions included in the PL pixel signal (polarized pixel signal) 65 are reset (removed), and the pixel values of adjacent vertically polarized pixels are used to set the pixel values of these reset pixels.

Similarly, the right-eye image signal (horizontally polarized image signal) 66b depicted in FIG. 6 is generated by means of pixel value interpolation processing in which the pixel values of vertically polarized pixel regions of the PL pixel regions included in the PL pixel signal (polarized pixel signal) 65 are reset (removed), and the pixel values of adjacent horizontally polarized pixels are used to set the pixel values of these reset pixels.

As a result, an image in which the pixel values included in the left-eye image signal (vertically polarized image signal) 66a have been set constitutes an image seen from the gravity center point 31 of the left side of the first polarization section 12 depicted in FIG. 1(B), in other words an image corresponding to a left-eye image.

Similarly, an image in which the pixel values included in the right-eye image signal (horizontally polarized image signal) 66b have been set constitutes an image seen from the gravity center point 32 of the right side of the first polarization section 12 depicted in FIG. 1(B), in other words an image corresponding to a right-eye image.

In this way, the polarized pixel interpolation processing unit 54, with respect to the PL pixel regions included in the PL pixel signal (polarized pixel signal) 65, interpolates information that is missing in the horizontal direction for each of the left-eye image and the right-eye image, and generates the left-eye image signal (vertically polarized image signal) 66a and the right-eye image signal (horizontally polarized image signal) 66b that have the same number of horizontal pixels as the input image.

These images generated by the polarized pixel interpolation processing unit 54 are input to a parallax detection unit 55.

The parallax detection unit 55, with respect to the two images of the left-eye image signal (vertically polarized image signal) 66a and the right-eye image signal (horizontally polarized image signal) 66b depicted in FIG. 6 and having the same number of horizontal pixels as the input image, uses block matching processing or the like, compares corresponding pixels, and obtains a subject deviation amount to thereby detect subject distance which serves as parallax information.

In other words, by means of block matching processing for example, deviation between pixels of the left-eye image and the right-eye image is detected, and subject distance corresponding to the amount of deviation is calculated.

The parallax detection unit 55, for example, generates a depth map 67 containing subject distance information corresponding to pixels.

It should be noted that the depth map 67 is data that contains subject distance information for each of the constituent pixels of an image. For example, the depth map is configured as an image in which brightness values corresponding to subject distance are set.

To be specific, regions having a small subject distance (near to the camera) have high brightness, and regions having a large subject distance (far away from the camera) have low brightness for example, and the parallax detection unit 55 generates a depth map in which these kinds of pixel value settings have been performed, and outputs the depth map to the parallax image generating unit 56.

It should be noted that, with regard to the images of the left-eye image signal (vertically polarized image signal) 66a and the right-eye image signal (horizontally polarized image signal) 66b generated by the polarized pixel interpolation processing unit 54, although the N pixel (non-polarized pixel) regions in the input image do not have image signals as depicted in FIG. 6, the parallax detection unit 55, with respect to the N pixel (non-polarized pixel) regions that do not have these pixel values, calculates a left-eye image in which interpolated pixel values based on the left-eye image signal (vertically polarized image signal) 66a are set, and a right-eye image in which interpolated pixel values based on the right-eye image signal (horizontally polarized image signal) 66b are set, and calculates distance information corresponding to all of the pixels, by means of matching processing between these images.

It should be noted that, in the pixel value interpolation processing, linear interpolation processing and the like can be used for example.

It should be noted that a parallax image (LR image) generated by the polarized pixel interpolation processing unit 54 is only used for generating the depth map 67 in the parallax detection unit 55 of the next stage, and it is sufficient as long as the parallax of the PL pixel regions is obtained.

The images seen from the viewpoints depicted in FIG. 6, in other words the images of the left-eye image signal (vertically polarized image signal) 66a and the right-eye image signal (horizontally polarized image signal) 66b, are images in which RGB signals have been set; however, an L image and an R image serving as parallax images may be generated using only G pixels included in the PL pixel signal (polarized pixel signal) 65 output by the polarized pixel separation unit 51.

Exemplary processing for generating a parallax image using only these G pixels is described with reference to FIG. 7.

Figure 7:
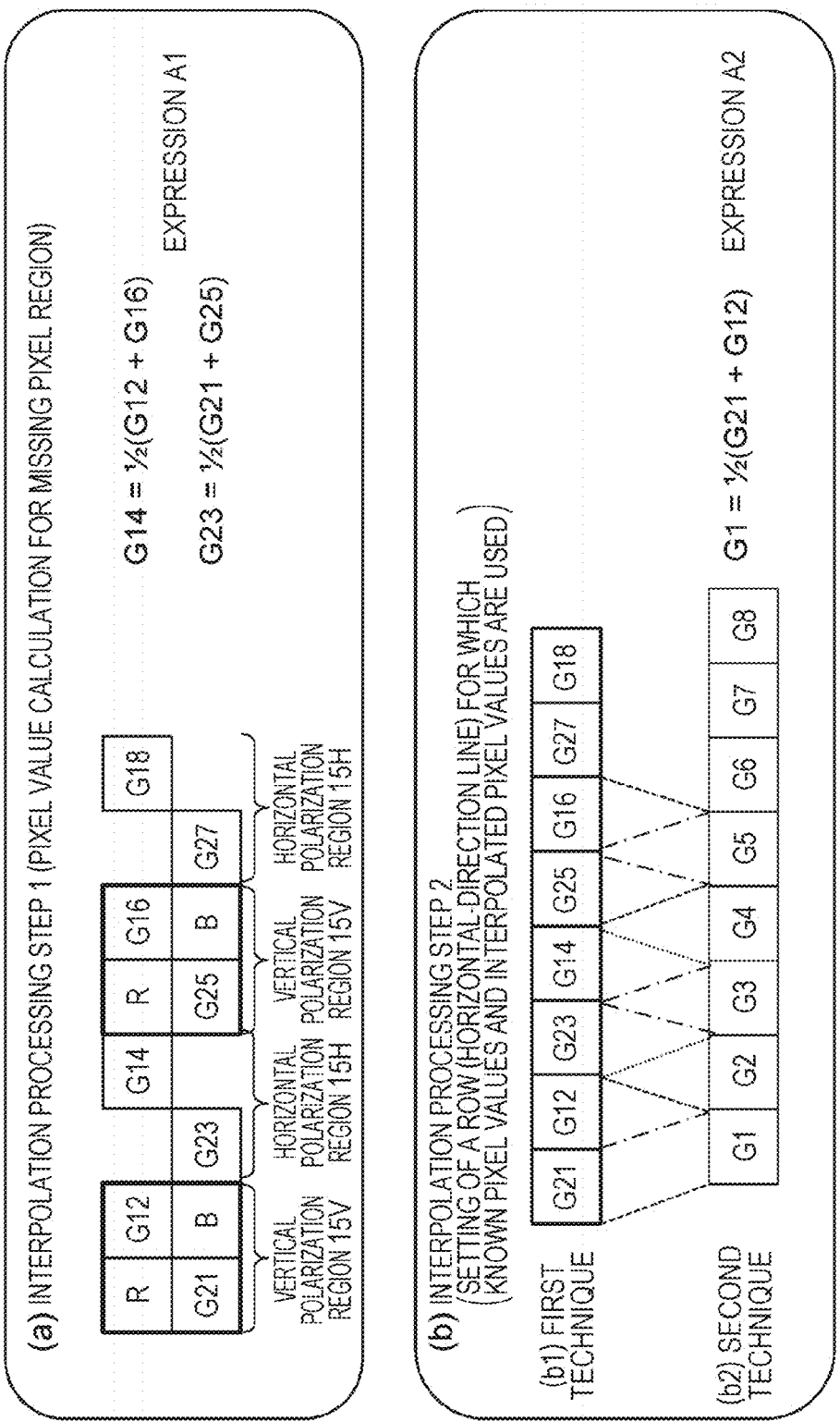
FIG. 7 is a drawing illustrating an example of processing performed by a polarized pixel interpolation processing unit.

Processing for generating a parallax image using only G pixels is made up of the following two interpolation processing steps shown in FIG. 7.

(a) Interpolation processing step 1=G pixel interpolation processing in polarized regions (b) Interpolation processing step 2=setting processing for horizontal-direction G pixel lines (rows)

FIG. 7(a) depicts this processing of (a) interpolation processing step 1=G pixel interpolation processing in polarized regions.

FIG. 7 depicts a processing example in which a left-eye image signal (vertically polarized image signal) is generated, in other words processing in which G pixels corresponding to a left-eye image signal are set in all of the pixel regions of the imaging element 16 on the basis of the left-eye image signal (vertically polarized image signal) included in the PL pixel signal 65 generated by the polarized pixel separation unit 51.

Next, as described with reference to FIG. 3 and FIG. 4, the vertical polarization region 15V, which is a left-eye-purpose image signal, and the horizontal polarization region 15H, which is a right-eye-purpose image signal, are repeatedly set as 2×2 pixel regions.

FIG. 7(a) depicts only two rows of a polarization region, and depicts a pixel region in which a vertical polarization region 15V corresponding to a 2×2-pixel left-eye image signal, and a horizontal polarization region 15H corresponding to a 2×2-pixel right-eye image signal are alternately set.

First, the pixel values of the horizontal polarization regions 15H corresponding to a right-eye-purpose image are deleted, and here the interpolated pixel values based on the pixel values of the G pixels in the vertical polarization regions 15V corresponding to a left-eye image signal are set.

For example, G14 and G23 depicted in FIG. 7(a) are G pixel values generated by means of interpolation processing.

For example, the pixel value G14 of G14 is calculated by means of the following expression using the pixel values (G12, G16) of the nearest G pixels in the two vertical polarization regions 15V corresponding to a left-eye image signal, to the left and right in the same row.

$G14=(\frac{1}{2})(G12+G16)$

Similarly, the pixel value G23 of G23 is calculated by means of the following expression using the pixel values (G21, G25) of the nearest G pixels in the two vertical polarization regions 15V to the left and right in the same row.

$G23=(\frac{1}{2})(G21+G25)$

In this way, when the left-eye-purpose image is generated, linear interpolation processing that is based on the G pixel values of left and right vertical polarization regions 15V corresponding to a left-eye-purpose image, is carried out in G pixel setting locations in horizontal polarization regions 15H corresponding to a right-eye-purpose image.

By means of this processing, the pixel value of one G pixel corresponding to a left-eye-purpose image is set in each column of the two-row polarization image regions.

The processing for setting these G pixels, one of which is set in each column, into a one-row line is depicted in FIG. 7(b). In other words, the (b) interpolation processing step 2 that equates to setting processing for a horizontal-direction G pixel line (row) is this interpolation processing step 2.

FIG. 7(b) depicts two techniques (technique 1, technique 2) as processing examples for this interpolation processing step 2.

(b1) The first technique is processing in which the G pixel values, one of which is in each column, set in step 1 depicted in FIG. 7(a) are arranged side by side in one row.

It should be noted that although polarization regions are set in two-row units, a one-row G pixel line is output with respect to two rows of vertical pixels.

(b2) The second technique is processing in which two adjacent G pixel values of the G pixel values, of which there is one in each column, set in step 1 depicted in FIG. 7(a) are used to calculate one new G pixel value to set a one-row G pixel line.

For example, as depicted in FIG. 7(b), the pixel value G1 of a new G pixel depicted in (b2) is calculated in accordance with the abovementioned expression, $G1=(\frac{1}{2})(G21+G12)$.

Similarly, two adjacent G pixel values set in step 1 depicted in FIG. 7(a) are used to calculate G2, G3, G4, and so on.

By executing interpolation processing step 2 in which either of technique 1 or technique 2 is carried out, the setting of G pixels corresponding to a left-eye viewpoint image is completed for pixels of rows corresponding to polarization regions.

It should be noted that although FIG. 7 depicts a processing example in which a left-eye image signal (vertically polarized image signal) is generated, for the generation processing of a right-eye image signal (horizontally polarized image signal), interpolation processing in which a right-eye image signal (horizontally polarized image signal) is used and a vertical polarization region 15V serves as an interpolation target region should be executed. By means of this interpolation processing, it is possible to carry out setting of G pixels corresponding to a right-eye viewpoint image in each row of a polarization region.

In this way, the polarized pixel interpolation processing unit 54 may have a configuration in which the two interpolated images of an interpolated image in which G pixel values for a left-eye image are set in polarization regions, and an interpolated image in which G pixel values for a right-eye image are set in polarization regions are generated and provided to the parallax detection unit 56.

The parallax detection unit 55 has the two interpolated images serving as parallax images made up of only these G pixels input thereto and generates a depth map 67.

This processing is described with reference to FIG. 8.

The interpolated images generated in the interpolation image generation processing executed by the polarized pixel interpolation processing unit 54 described with reference to FIG. 7 are the interpolated images of the interpolated image in which G pixel values for a left-eye image are set in polarization regions, and the interpolated image in which G pixel values for a right-eye image are set in polarization regions.

First, the parallax detection unit 55 applies these interpolated images to calculate parallax corresponding to the pixels of a polarization region, and calculates a subject distance (D: depth) corresponding to the parallax.

Next, depth interpolation processing is executed in which the depth information of only this polarization region is used to estimate the depth of a non-polarization region. FIG. 8 is a drawing depicting a processing example for this depth information interpolation.

Figure 8:
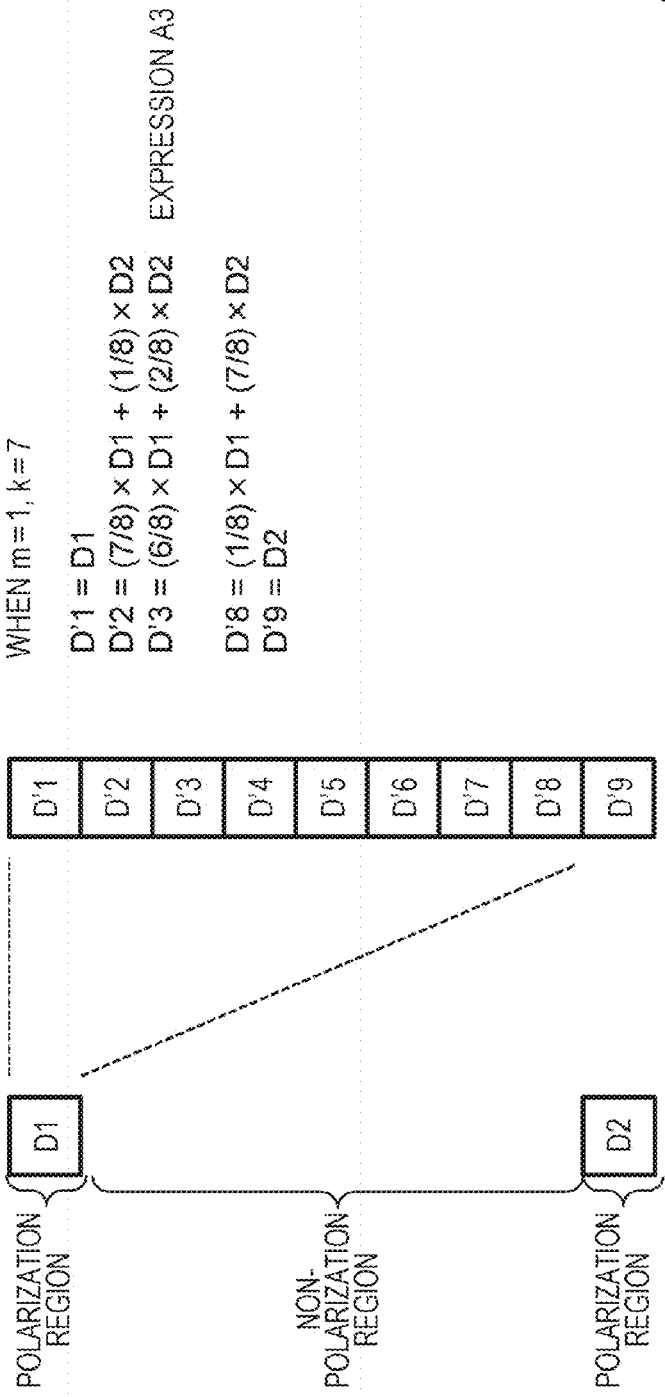
FIG. 8 is a drawing illustrating an example of processing performed by a parallax detection unit.

As depicted in FIG. 8, depths D1 and D2 that are set in polarization regions are used to calculate and set depths corresponding to each pixel of a non-polarization region.

The example of FIG. 8 depicts an example in which the polarization regions are set as single rows and the non-polarization region is set as seven rows in order to simplify the explanation, and D1 and D2 each constitute depth information corresponding to pixels of the polarization regions of arbitrary columns.

These constitute depth information calculated by means of the interpolated images generated by the polarized pixel interpolation processing unit 54 of an interpolated image in which G pixel values for a left-eye image are set in polarization regions, and an interpolated image in which G pixel values for a right-eye image are set in polarization regions.

In addition, the parallax detection unit 55 estimates and sets depths corresponding to pixels in the non-polarization region on the basis of this depth information. FIG. 8 depicts exemplary calculation processing for nine items of depth information (D'1 to D'9) of the same column that are calculated on the basis of the depths D1 and D2 that correspond to two pixels of a polarization region in an arbitrary column. To be specific, calculation processing such as that below is executed for example.

$D'1 = D1$ $D'2 = (7/8)D1 + (1/8)D2$ $D'3 = (6/8)D1 + (2/8)D2$

...

$D'8 = (1/8)D1 + (7/8)D2$ $D'9 = D2$

In this way, a depth map is generated by carrying out expansion processing using D1 and D2, setting weightings corresponding to the distances from D1 and D2, and estimating the depths of the pixels.

The depth map 67 generated in this way is provided to the parallax image generating unit 56.

Here, an explanation has been given with respect to expansion processing in which, in the example of FIG. 8, the polarization regions are single rows and the non-polarization region is seven rows for the sake of simplicity; however, in the case where a polarization region is two rows as described in FIG. 6, a one-row depth map is generated for the polarization region as mentioned above using FIG. 7. Since this depth map is, in a virtual sense, the depth map of a center row of the two rows of the polarization region, a depth map is generated by setting weightings corresponding to the distances and estimating the depths of the pixels in the same way as in the explanation for FIG. 8, with respect to the two rows of the polarization region and k rows of a non-polarization region.

As mentioned above, various processing can be applied as interpolation image generation processing for the parallax information calculation in the polarized pixel interpolation processing unit 54, and as generation processing for the depth map 67 in the parallax detection unit 55.

Next, the processing executed in the parallax image generating unit 56 is described.

The parallax image generating unit 56 uses the 2D-RGB image 63, which is a two-dimensional image output from the demosaic processing unit 53, and the depth map 67 serving as parallax information output from the parallax detection unit 55 to generate the two images of a left-eye image (L image) 71 and a right-eye image (R image) 72.

In other words, image conversion processing in which parallax that corresponds to subject distance is set on the basis of the depth map 67 that serves as parallax information is carried out with respect to the 2D-RGB image 63, and the left-eye image (L image) 71 and the right-eye image (R image) 72 are generated and output.

It should be noted that this image conversion processing executed in the parallax image generating unit 56 is processing in which a left-eye image (L image) 71 and a right-eye image (R image) 72 that are applicable for three-dimensional image display are generated and output by means of image conversion based on one two-dimensional image (2D image), and is processing that is generally referred to as 2D/3D conversion processing.

An example of 2D/3D conversion processing executed in the parallax image generating unit 56 is described hereafter. It should be noted that various processing is proposed for the 2D/3D conversion processing, and 2D/3D conversion processing in which another known technique is applied may be carried out in the parallax image generating unit 56 without restriction to the processing described hereafter.

One specific example of 2D/3D conversion processing executed in the parallax image generating unit 56 is described.

In the parallax image generating unit 56, by means of 2D/3D conversion processing using the depth map 67, a right-eye image and left-eye image that are applicable for three-dimensional image display are generated from one image input from the demosaic processing unit 53, in other words the 2D-RGB image 63.

The parallax image generating unit 56 generates a right-eye image and a left-eye image in which parallax (shift amount) corresponding to subject distance information in pixel region units obtained from the depth map are generated and output via the image output unit 57.

Figure 9:
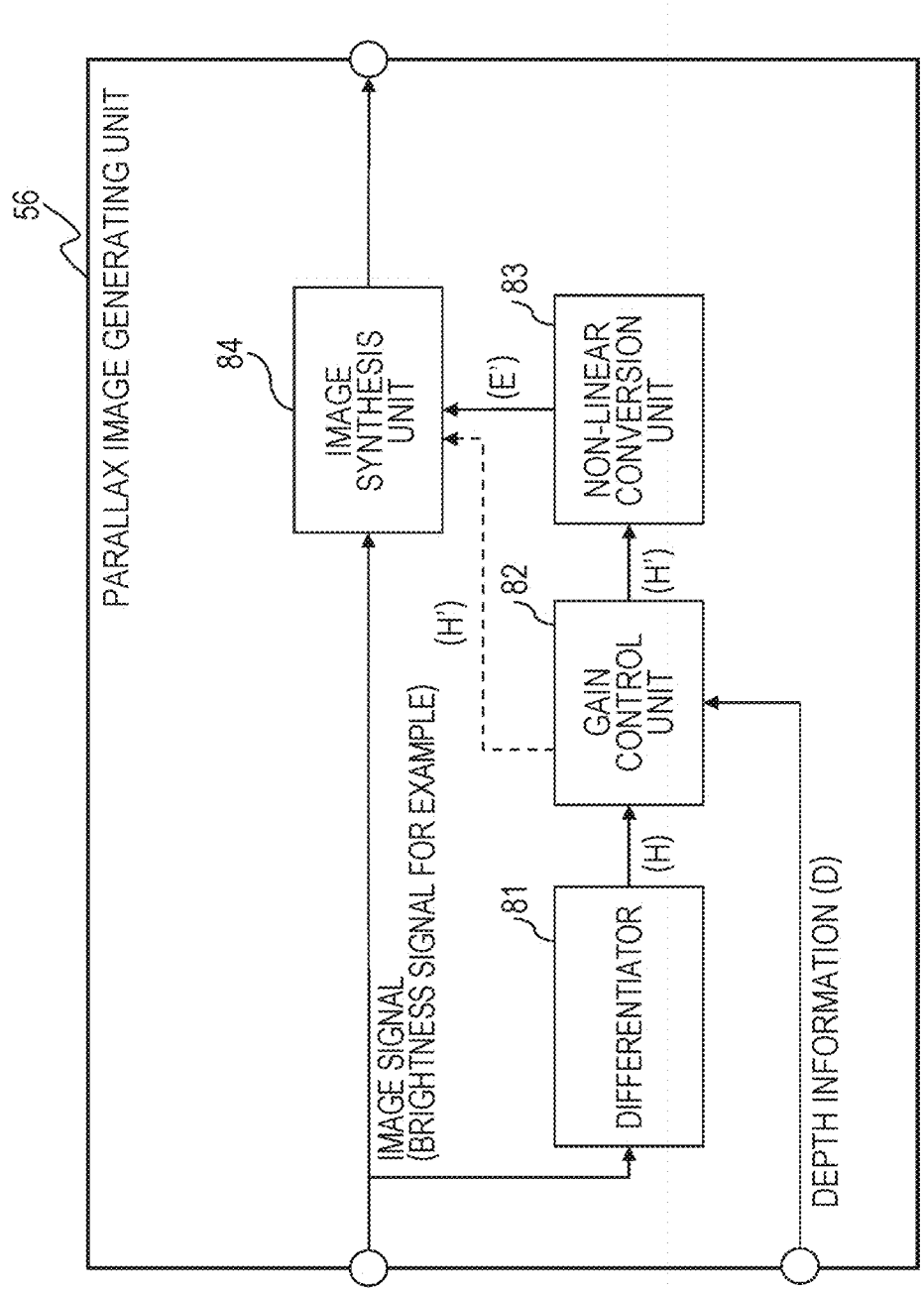
FIG. 9 is a drawing illustrating an exemplary configuration of a parallax image generating unit.

FIG. 9 is a block diagram depicting the configuration of one embodiment of the parallax image generating unit 56.

The parallax image generating unit 56 carries out processing in which an image of a new viewpoint is generated by extracting a spatial feature quantity of an input image signal, and carrying out different emphasis processing for the extracted feature quantity. The parallax image generating unit 56 is configured from a differentiator 81, a gain control unit 82, a non-linear conversion unit 83, and an image synthesis unit 84.

The differentiator 81 extracts a brightness signal from video data input to the parallax image generating unit 56, and generates a differential signal (H) for the brightness signal. To be specific, a signal is generated by inputting the brightness signal of an image in the horizontal direction, and subjecting the input brightness signal to first-order differentiation for example. For the first-order differentiation processing, a horizontal-direction 3-tap linear first-order derivative filter or the like is used.

It should be noted that although an explanation is given with respect to an example in which a brightness signal serves as processing data in the embodiment, a color signal (RGB or the like) not a brightness signal may be used as processing target data.

By multiplying a differential signal (H) output from the differentiator 81 by a coefficient (gain coefficient) prescribed by a preset rule, the gain control unit 82 controls the amplitude value of the differential signal, and generates a corrected differential signal (H') that is a corrected signal of the differential signal.

The non-linear conversion unit 83 subjects the corrected differential signal (H') output from the gain control unit 82 to conversion in a non-linear manner, and outputs the result to the image synthesis unit 84 as a parallax emphasis signal (E').

The image synthesis unit 84, for example, carries out processing in which an image of a new viewpoint is generated by applying frame images making up video data serving as processing target images, and a spatial feature quantity generated from these frame images, in other words a corrected differential signal (H') of a brightness signal, or a parallax emphasis signal (E') generated by subjecting this corrected differential signal to non-linear conversion.

It should be noted that, as indicated by the dotted line in FIG. 9, a configuration is permissible in which the conversion processing performed by the non-linear conversion unit 83 is omitted, the corrected differential signal (H') that is corrected and processed by the gain control unit 82 is input directly to the image synthesis unit 84, and the image synthesis unit 84 applies the corrected differential signal to generate an image of a new viewpoint.

Next, the processing executed by the gain control unit 82 is described.

Figure 10:
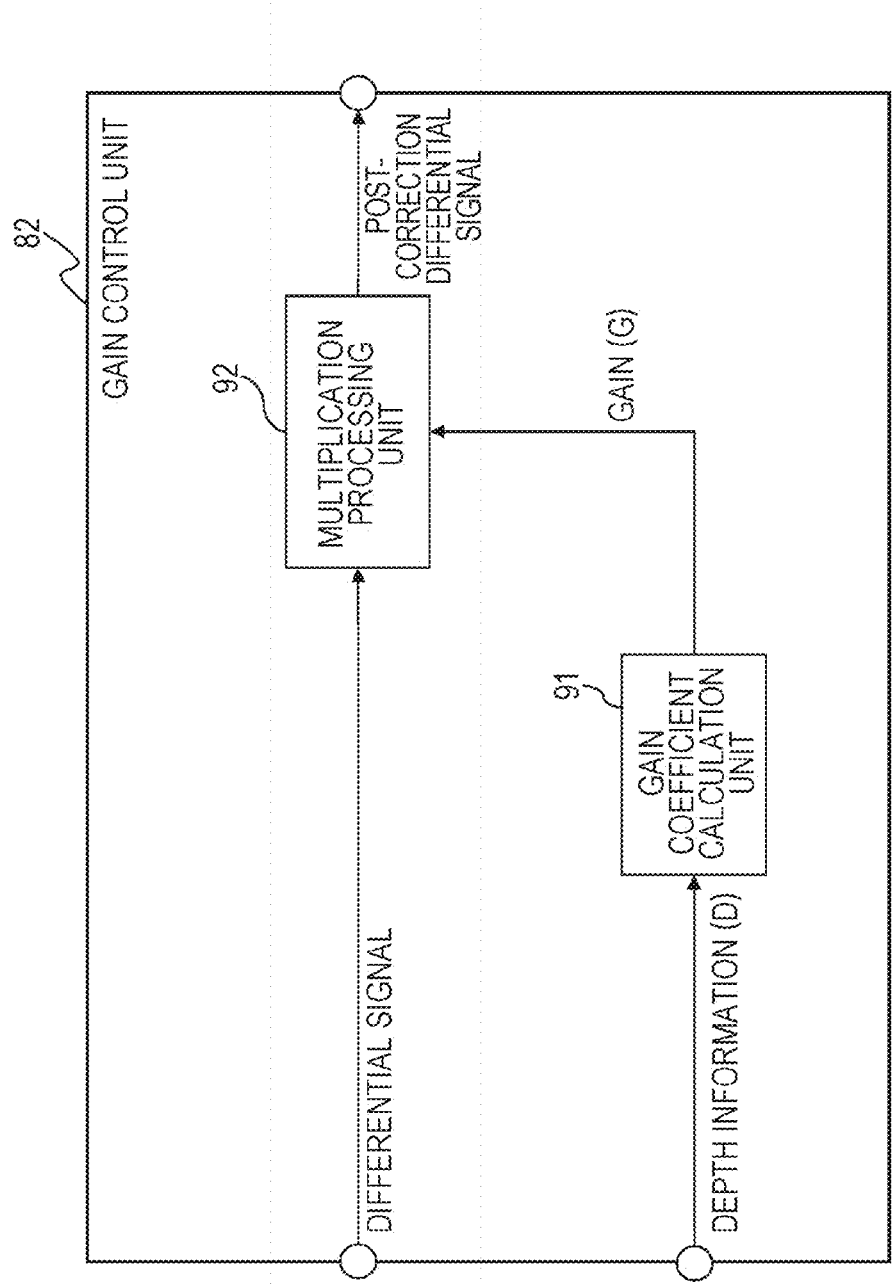
FIG. 10 is a block diagram depicting a configuration of a gain control unit according to an embodiment.

FIG. 10 is a block diagram depicting the configuration of one embodiment of the gain control unit 82. In the gain control unit 82, the amplitude value of an input differential signal is controlled on the basis of similarly input depth information. It should be noted that, in the embodiment described hereafter, depth information is described as having one depth value for each pixel of an input differential signal, and as being input in the form of what has been referred to as a depth map. The depth information is information acquired from a depth map 67 generated by the parallax detection unit 55.

The gain coefficient calculation unit 91 uses the depth information for input pixels to output a gain coefficient for corresponding pixels.

The multiplication processing unit 92 carries out, with respect to the pixels of a differential signal that is input, multiplication processing in which the amplitude value of the differential signal (H) is multiplied by a gain coefficient for pixels output from the gain coefficient calculation unit 91, and as a result outputs a corrected differential signal (H') for which the amplitude value has been subjected to gain control.

Figure 11:
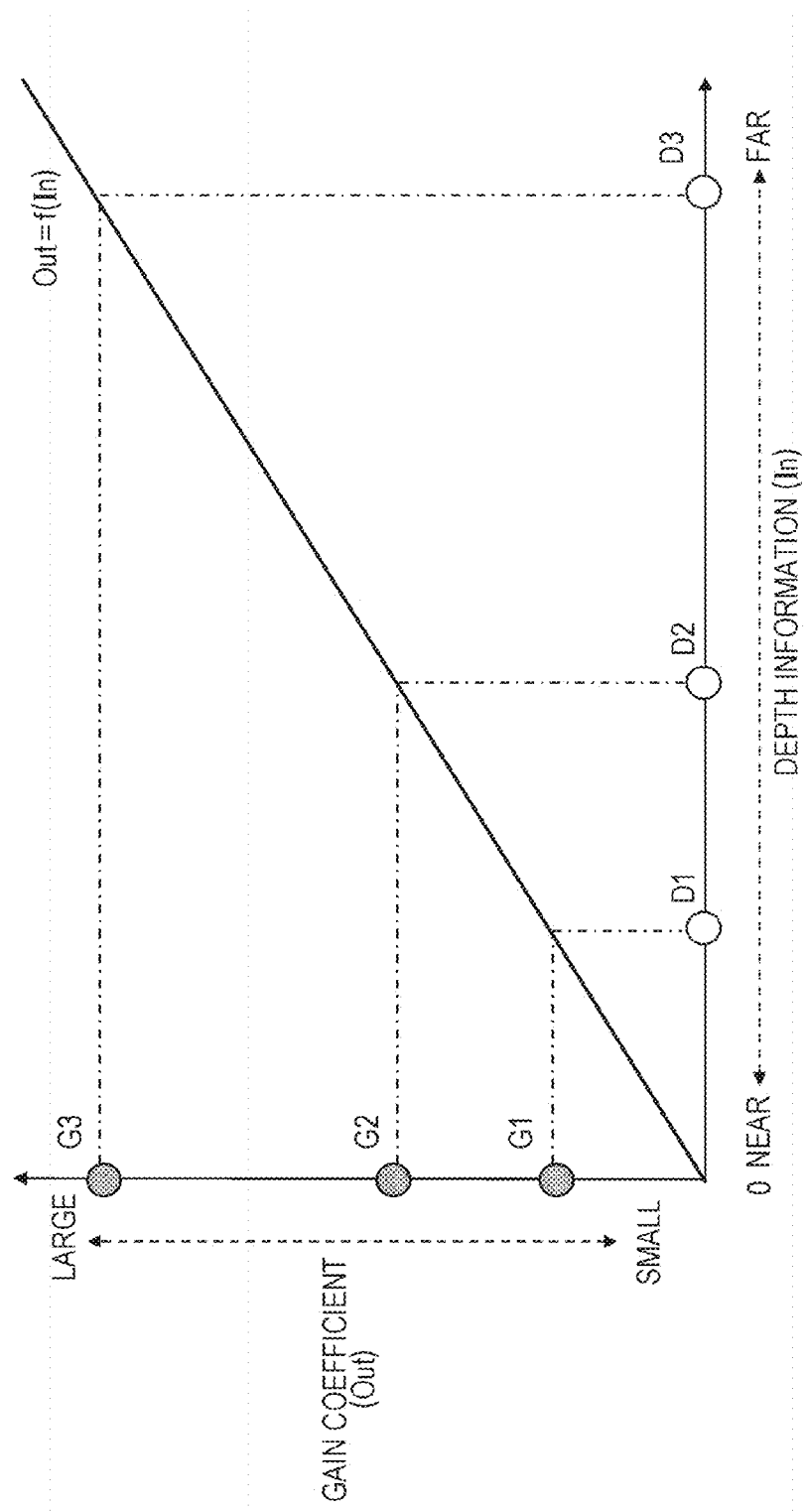
FIG. 11 is a diagram depicting an example of a gain coefficient determination method executed in a gain coefficient calculation unit.

FIG. 11 is a diagram depicting an example of a gain coefficient determination method executed in the gain coefficient calculation unit 91. The horizontal axis represents an input signal and depth information. The vertical axis represents gain coefficient output in the gain coefficient calculation unit 91.

The gain coefficient calculation unit 91 converts input depth information (In) by means of a preset function f(x), and outputs a gain coefficient (Out).

In this case, various settings can be used for the function f(x).

An example of the function f(x) is, for example:

$$f(x) = A \times x$$

(wherein A is a constant).

A linear first-order function such as the expression indicated above is used. A is a preset constant, and can be set to various values.

Furthermore, the conversion function in the gain coefficient calculation unit 91 is not restricted to a linear first-order function, and furthermore a non-linear conversion may be carried out.

With regard to the depth information, values corresponding to the pixels of a differential signal are input, and gain coefficients corresponding to the pixels are output.

FIG. 11 is a diagram depicting an example of the correspondence between input values (depth information) and output values (gain coefficients) of the gain coefficient calculation unit. FIG. 11 depicts an example of three input values (depth information) and three output values (gain coefficients) corresponding thereto.

Examples of the input values (depth information) are D1, D2, and D3, and are assumed to be depth values corresponding to a certain three pixels. It should be noted that depth is a value corresponding to the distance from an observer (user) or a camera to a subject.

The depth (=subject distance) is greater from the near side to the far side (further away from the user or the camera) in the order of D1<D2<D3. Here, in FIG. 11, the location where depth information In=0 is the point where a generated image is perceived on a display screen when displayed on a three-dimensional display device.

In this case, examples of output values (gain coefficients) are G1, G2, and G3, and these are values obtained by inputting the values of D1, D2, and D3 into the function f(x) of FIG. 11.

As in this example, the gain coefficient calculation unit 91 outputs gain coefficients corresponding to the pixels of a differential signal.

FIG. 12 depicts an example of processing for controlling the amplitude value of a differential signal in the gain control unit 82.

FIG. 12 depicts examples of (a) an input signal, (b) a differential signal, (c) depth information, and (d) a post-correction differential signal.

FIG. 12(a) is an example of an input image signal.

FIG. 12(b) is an image in which the input image signal of FIG. 12(a) has been subjected to differential processing.

FIG. 12(c) is depth information corresponding to the input image signal of FIG. 12(a), and is simple information in which depth values have been applied to regions produced by separating the image into three sections.

Here, the depth information values of D3, D2, and D1 (D1<D2<D3) that are defined in FIG. 11 are applied in this order from the upper section in the image signal for which the depth information of FIG. 12(c) is indicated.

In this case, the gain values by which the pixels of the differential signal of FIG. 12(b) are to be multiplied are G3, G2, and G1 (G1<G2<G3) in this order from the upper section of the image, as per the relationship between the depths and the gain values illustrated in FIG. 11.

The post-correction differential signal of FIG. 12(d) is an example of the processing result produced by multiplying the pixels of the differential signal of FIG. 12(b) by the gain values based on the depth information of FIG. 12(c).

In the post-correction differential signal of FIG. 12(d), a larger gain value is multiplied the higher the region is in the screen (the further away the region is), and a smaller gain value is multiplied the lower the region is in the screen (the nearer the region is).

As a result, the amplitude value of the differential signal increases the higher the region is in the screen (the further away the region is), and the amplitude of the differential signal decreases the lower the region is in the screen (the nearer the region is).

The parallax image generating unit 56 that executes 2D/3D conversion processing uses differential signals having different amplitudes corresponding to distance in this way to generate and output a new viewpoint image.

Next, the processing executed by the non-linear conversion unit 83 is described. The non-linear conversion unit 83 generates a parallax emphasis signal (E'), for which the corrected differential signal (H') subjected to gain control in accordance with distance and output from the gain control unit 82 has been non-linearly converted, and outputs the parallax emphasis signal (E') to the image synthesis unit 84.

Figure 13:
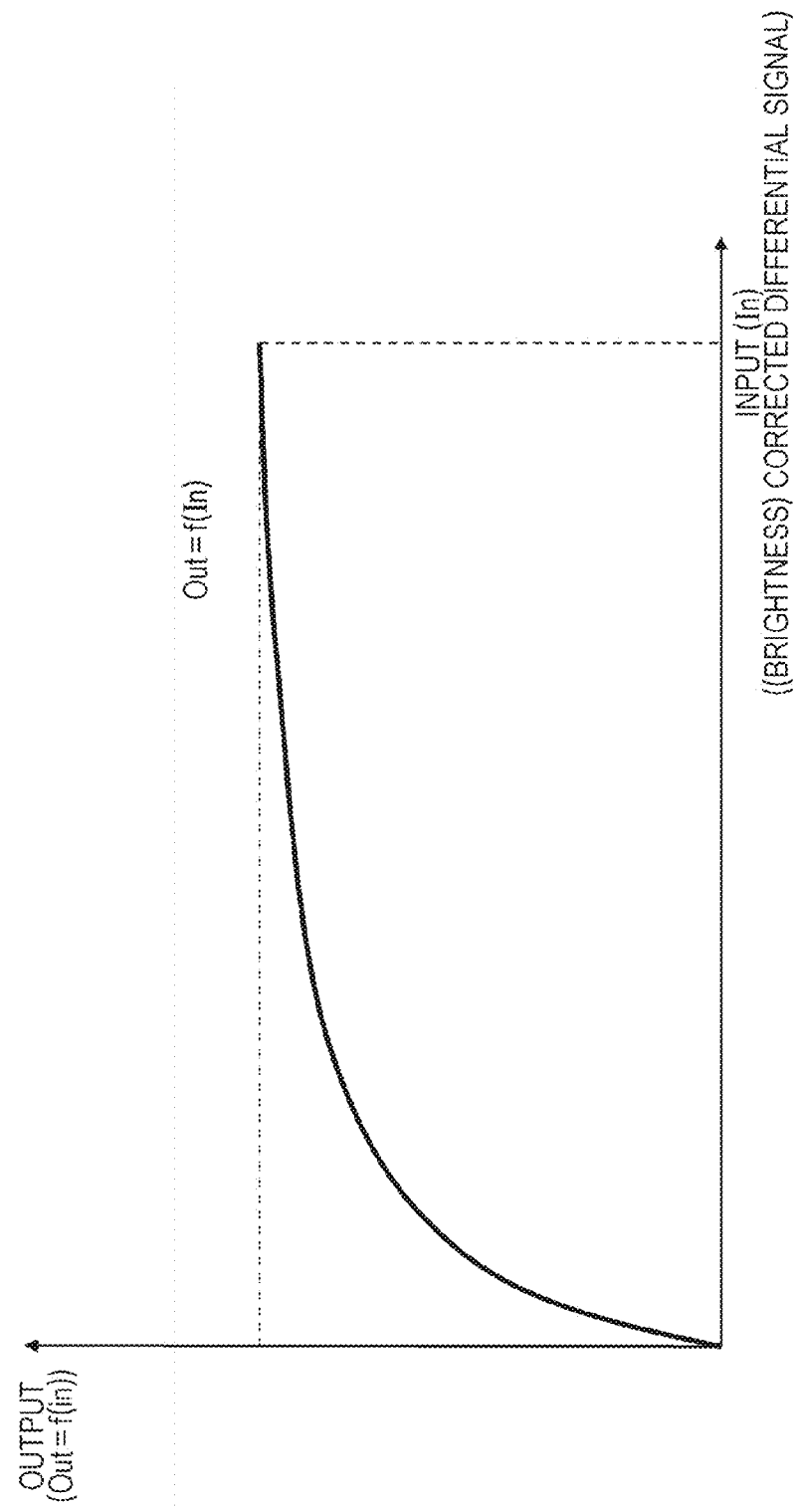
FIG. 13 is a drawing illustrating an example of non-linear conversion processing executed in a non-linear conversion unit.

FIG. 13 depicts an example of non-linear conversion processing executed in the non-linear conversion unit 83. The horizontal axis represents a differential signal that has been subjected to gain control (correction) in accordance with distance and output from the gain control unit 82, and is a (brightness) corrected differential signal. The vertical axis represents the output after the non-linear conversion processing in the non-linear conversion unit 83. The non-linear conversion unit 83 converts an input corrected differential signal (In) by means of the prescribed function f(x), and outputs a parallax emphasis signal (Out). In other words, Out=f(In). In this case, various settings can be used for the function f(x). An example of the function f(x) is as follows.

$$f(x) = x^\gamma$$

An exponential function such as the expression indicated above is used, in which γ is a preset coefficient and can be set to various values.

Furthermore, the conversion function in the non-linear conversion unit 83 is not restricted to an exponential function, and may also carry out linear conversion.

The image synthesis unit 84 carries out processing in which the parallax emphasis signal that is output from the non-linear conversion unit 83, and the 2D image that is input to the parallax image generating unit 56 are synthesized, and a new viewpoint image is generated.

It should be noted that, as indicated by the dotted line in FIG. 9, a configuration is permissible in which the conversion processing performed by the non-linear conversion unit 83 is omitted, and the corrected differential signal (H'), for which gain control corresponding to distance is performed by the gain control unit 82 with respect to a differential signal generated by the differentiator 81, is input directly into the image synthesis unit 84. In this case, the image synthesis unit 84 carries out processing in which the corrected differential signal (H'), for which gain control has been performed in accordance with depth (subject distance), is applied to generate an image of a new viewpoint.

Next, the processing performed by the image synthesis unit 84 is described.

The image synthesis unit 84 carries out processing in which a spatial feature quantity generated from the processing target image, in other words the differential signal of a brightness signal, or a parallax emphasis signal generated by subjecting this differential signal to non-linear conversion, is applied to generate an image of a new viewpoint.

Figure 14:
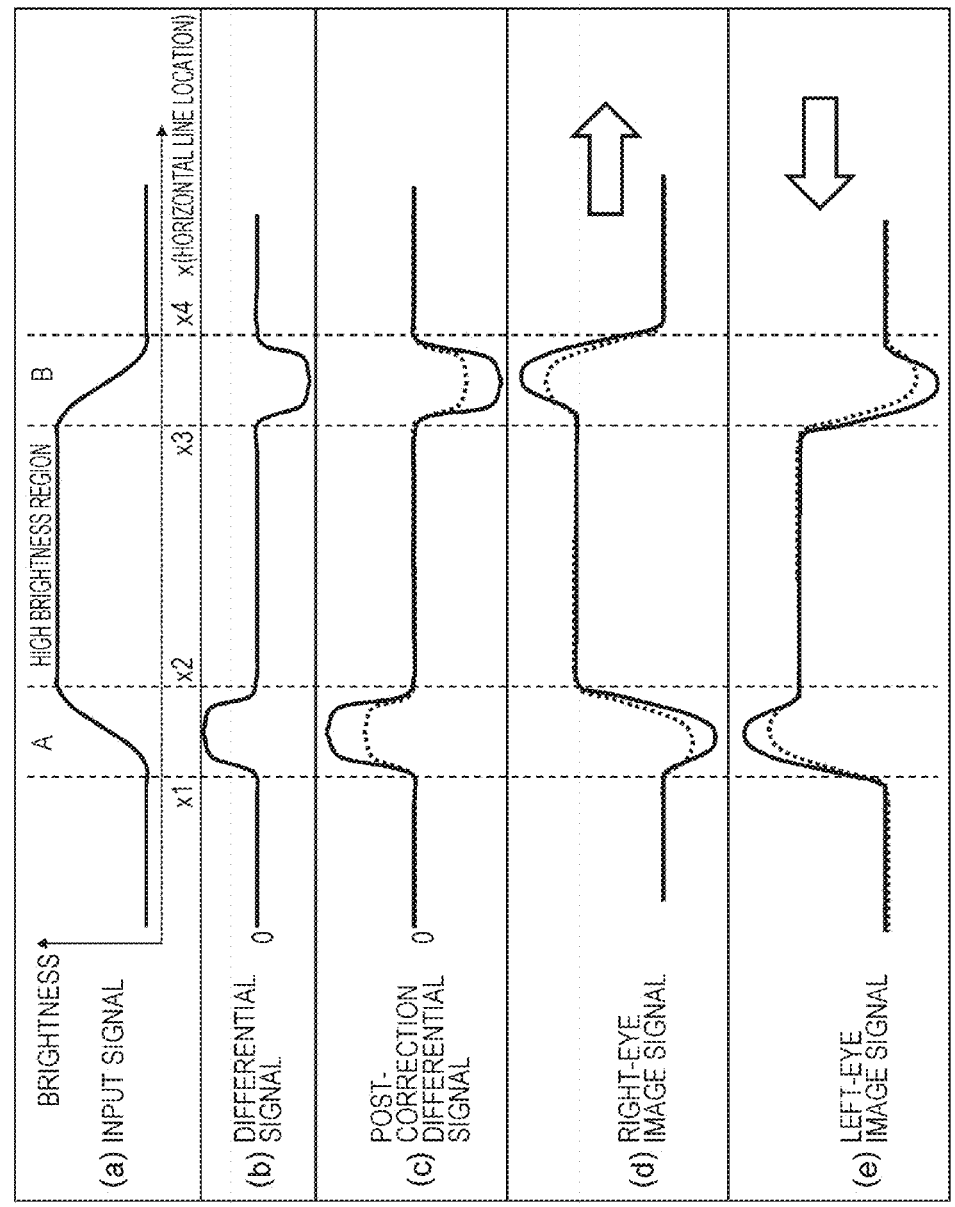
FIG. 14 is a drawing illustrating image synthesis processing executed in an image synthesis unit.
Figure 15:
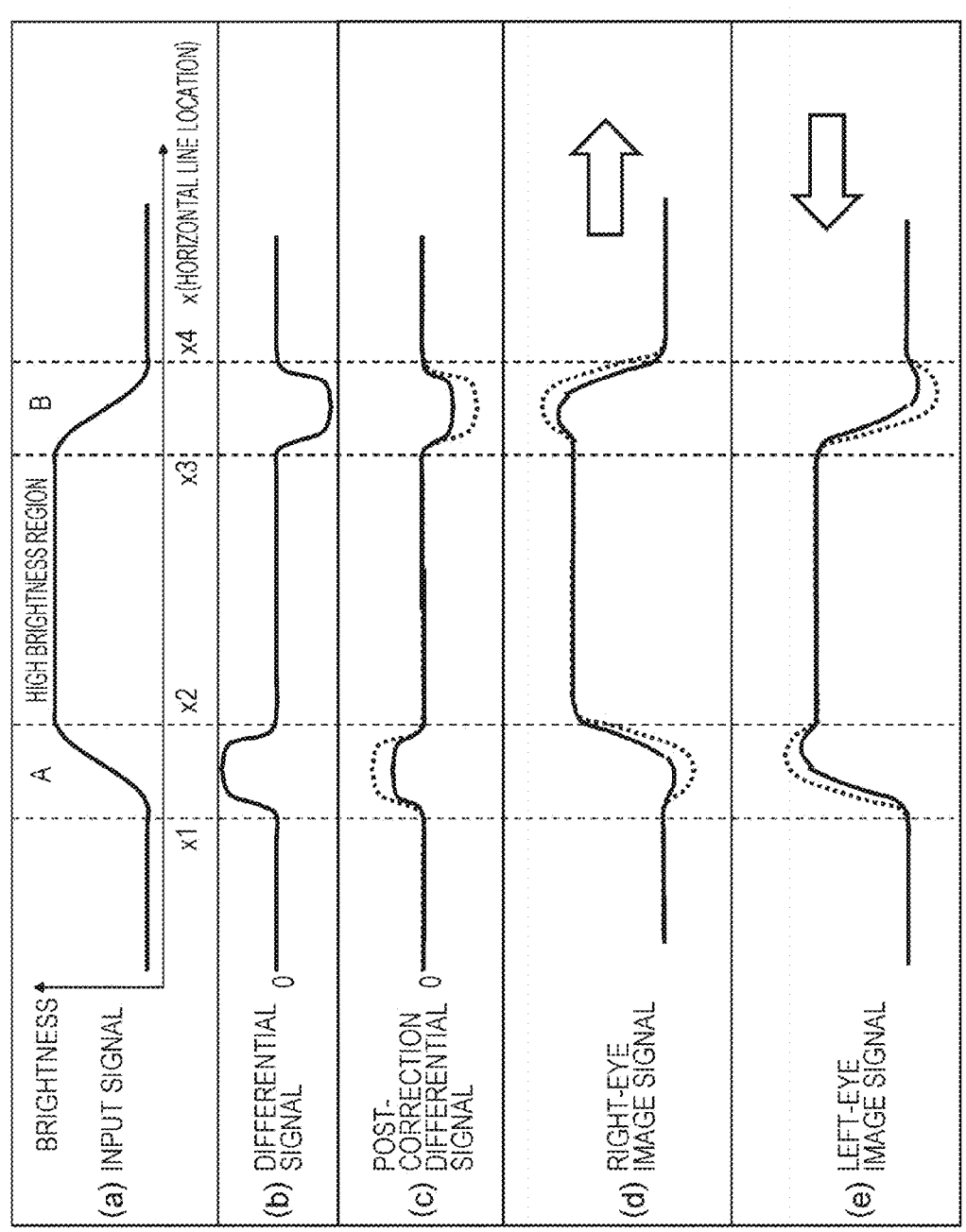
FIG. 15 is a drawing illustrating image synthesis processing executed in an image synthesis unit.

FIG. 14 and FIG. 15 depict the concept for the image synthesis processing executed in the image synthesis unit 84.

FIG. 14 is an image region in which the distance is large (image region having great depth), FIG. 15 is an image region in which the distance is small (image region having little depth), and with regard to these image regions, the following signals are depicted in descending order: (a) an input signal (S), (b) a differential signal (H), (c) a post-correction (gain control) corrected differential signal (H'), (d) a right-shift image signal, (e) and a left-shift image signal.

If described in association with the (c) depth information of FIG. 12, for example, FIG. 14 indicates a processing example that corresponds to the image region for which the distance is large (=D3; image region having great depth) of the upper image section of FIG. 12(*c*). On the other hand, FIG. 15 indicates a processing example for the image region for which the distance is small (=D1; image region having little depth) of the lower image section of FIG. 12(*c*).

First, the processing example for the region in which the distance is large (image region having great depth) depicted in FIG. 14 is described.

The (a) image signal (S) indicates the change in brightness in one arbitrary horizontal line of an arbitrary frame of video data. An example is given of one line in which there is a high brightness region having high brightness in the center section. In region A from line location (x1) to line location (x2) a change in which the brightness gradually increases is indicated, in line locations (x2) to (x3) there is a high brightness portion in which a high level of brightness is maintained, and thereafter in region B from line location (x3) to line location (x4) a change in which the brightness gradually decreases in indicated.

The (b) differential signal (H) is the differential result of the (a) input signal. This differential signal is a signal that is generated in the differentiator 81 of the parallax image generating unit 56 depicted in FIG. 9.

As depicted in FIG. 14, the differential signal (H) generated by the differentiator 81 takes a positive value in region A in which the change in brightness of the (a) input signal (S) is positive, and takes a negative value in region B in which the change in brightness of the (a) input signal is negative.

The (c) post-correction (gain control) differential signal (H') is a signal that is generated in the gain control unit 82 of the parallax image generating unit 56 depicted in FIG. 9, and is a signal for which the FIG. 14(*b*) differential signal has been corrected (subjected to gain control) on the basis of depth information. It should be noted that the example depicted in FIG. 14 is a processing example for the image region in which the distance is large (image region having great depth; for example, D3 of FIG. 11 and FIG. 12(*c*)), and that correction processing by means of a larger gain (G3) is carried out as described with reference to FIG. 11 and FIG. 12, and the amplitude of the differential signal is corrected to a larger amplitude.

The dotted line depicted in FIG. 14(*c*) is the signal before correction (=(b) differential signal (H)), and the solid line depicted in FIG. 14(*c*) is the corrected differential signal (H') subsequent to the correction corresponding to distance. In this way, the corrected differential signal (H') is corrected by means of gain control corresponding to distance so that the amplitude is larger.

The (d) right-shift image signal and the (e) left-shift image signal are signals generated by the image synthesis unit 84 depicted in FIG. 9.

For example, in the case where a 2D image that is input from the demosaic processing unit 53 to the parallax image generating unit 56 depicted in FIG. 5 is the input image depicted in FIG. 14(*a*), by right-shifting this input image, a (d) right-eye image signal is generated. Furthermore, the (e) left-eye image signal is generated by left-shifting this input image.

To be specific, a (d) right-eye image signal or a (e) left-eye image signal is generated by synthesizing the (a) input signal (S) and the parallax emphasis signal (E') that is the result (output of the non-linear conversion unit 83) of subjecting the corrected differential signal (H') subsequent to (c) correction (gain control) to non-linear conversion in the non-linear conversion unit 83.

As depicted in FIG. 14(*d*), in the case where the corrected differential signal (H') that has been corrected by means of a large gain (G3) is synthesized, compared to the case where the pre-correction differential signal (H) is synthesized, an image signal having a large right shift is generated. Similarly, in FIG. 14(*d*), an image signal having a large amount of left shift is generated.

Next, the processing example for the image region in which the distance is small (image region having little depth) depicted in FIG. 15 is described. FIG. 15 indicates a processing example for the image region for which the distance is small (=D1; image region having little depth) of the lower image section of FIG. 12(*c*).

The (a) input signal and the (b) differential signal are the same signals as the (a) input signal and the (b) differential signal depicted in FIG. 14. The (b) differential signal (H) is the differential result of the (a) input signal (S). This differential signal is a signal that is generated in the differentiator 81 depicted in FIG. 9. As depicted in FIG. 15, the differential signal generated by the differentiator 81 takes a positive value in region A in which the change in brightness of the (a) input signal is positive, and takes a negative value in region B in which the change in brightness of the (a) input signal is negative.

The (c) post-correction (gain control) corrected differential signal (H') is a signal that is generated in the gain control unit 82 depicted in FIG. 9, and is a signal for which the FIG. 15(b) differential signal has been corrected (subjected to gain control) on the basis of depth information.

The example depicted in FIG. 15 is a processing example for the image region in which the distance is small (image region having great depth; for example, D1 of FIG. 11 and FIG. 12(c)), and the amplitude of the differential signal is corrected to a small amplitude by means of a small gain (G1) as described with reference to FIG. 11 and FIG. 12.

The dotted line depicted in FIG. 15(c) is the correction signal before correction (=(b) differential signal), and the solid line depicted in FIG. 15(c) is the signal subsequent to the correction corresponding to distance. In this way, the amplitude is corrected to be smaller by means of gain control corresponding to distance.

The (d) right-eye image signal and the (e) left-eye image signal are signals that are generated in the image synthesis unit 84 depicted in FIG. 9. The image synthesis unit 84 synthesizes the (a) input signal (S) and the parallax emphasis signal (E') that is the result (output of the non-linear conversion unit 83) of subjecting the (c) corrected differential signal (H') subsequent to correction (gain control) to non-linear conversion in the non-linear conversion unit 83, and a (d) right-eye image signal or a (e) left-eye image signal is generated.

For example, in the case where a 2D image that is input from the demosaic processing unit 53 to the parallax image generating unit 56 depicted in FIG. 5 is the input image depicted in FIG. 15(a), by right-shifting this input image, a (d) right-eye image signal is generated.

Furthermore, the (e) left-eye image signal is generated by left-shifting this input image.

As depicted in FIG. 15(d), in the case where the corrected differential signal (H') that has been corrected by means of a small gain (G1) is synthesized, compared to the case where the pre-correction differential signal (H) is synthesized, an image signal having a small amount of right shift is generated. Similarly, in FIG. 14(d), an image signal having a small amount of left shift is generated.

In this way, in the case where an image such as an image perceived to be further away than the display screen is to be generated, the parallax image generating unit 56 generates the corrected differential signals ((c) in FIG. 14 and FIG. 15) of a corrected differential signal having a large amplitude in the case where the distance is large, and a corrected differential signal having a small amplitude in the case where the distance is small, and by means of synthesis processing between these corrected differential signals (or parallax emphasis signals that are the non-linear conversion results thereof) and the (a) input signal, generates a (d) right-eye image signal or a (e) left-eye image signal that corresponds to an image observed from a viewpoint that is different from the input image.

This kind of generation processing for a (d) right-eye image signal and a (e) left-eye image signal is described using numerical formulas.

The brightness level of video data corresponding to the (a) input signal of FIG. 14 and FIG. 15 is taken as (S), and the signal level of the differential signal depicted in (b) of FIG. 14 and FIG. 15 is taken as (H).

Furthermore, the signal level of the corrected differential signal serving as the result of the correction of the differential signal carried out in the gain control unit 82 is taken as (H').

It should be noted that when the corrected differential signal (H') is generated, the gain value (G) by which the (b) differential signal (H) is multiplied is determined from a preset function or the like on the basis of the depth information (D).

The gain value in the case where the distance is large indicated in FIG. 14 is taken as G3, and the gain value in the case where the distance is small indicated in FIG. 15 is taken as G1.

In the examples depicted in FIG. 14 and FIG. 15, the relationship of G3>1>G1 is assumed.

If the signal level of the (c) post-correction differential signal of FIG. 14 and FIG. 15 is expressed as (H'), (H') can be represented by the following expression as a signal corrected using the gain values G3 and G1.

The corrected differential signal (H') in the case where the distance is large indicated in FIG. 14 is as follows.

$$H'=G3 \times H$$

The corrected differential signal (H') in the case where the distance is small indicated in FIG. 15 is as follows.

$$H'=G1 \times H$$

Signals calculated by means of these expressions have the signal levels (H') of the (c) post-correction differential signals of FIG. 14 and FIG. 15.

In the case where the distance is large indicated in FIG. 14(c), if the post-correction differential signal (H') indicated by the solid line and the pre-correction differential signal (=(b)) indicated by the dotted line are compared, the post-correction differential signal (H') indicated by the solid line has a larger amplitude than the pre-correction differential signal indicated by the dotted line.

On the other hand, in the case where the distance is small indicated in FIG. 15(c), if the post-correction differential signal (H') indicated by the solid line and the pre-correction differential signal (=(b)) indicated by the dotted line are compared, the post-correction differential signal (H') indicated by the solid line has a smaller amplitude than the pre-correction differential signal indicated by the dotted line.

This is because the post-correction differential signals depicted in FIG. 14(c) and FIG. 15(c) are generated by multiplication with different gain values.

In other words, for pixels having large-depth information (large distance from the camera) in the depth map output by the parallax detection unit 55, the post-correction differential signal indicated in FIG. 14(c) is generated by the (b) differential signal being multiplied by a large gain value and corrected.

On the other hand, for pixels having small-depth information (small distance from the camera) in the depth map output by the parallax detection unit 55, the post-correction differential signal indicated in FIG. 15(c) is generated by the (b) differential signal being multiplied by a small gain value and corrected.

The post-correction differential signals depicted in FIG. 14(c) and FIG. 15(c) are subjected to non-linear conversion processing in the non-linear conversion unit 83 in accordance with the settings previously described with reference to FIG. 13 for example, and a parallax emphasis signal (E') is generated.

The image synthesis unit 84 has input thereto the video data (S) corresponding to the (a) input signal, and the parallax emphasis signal (E') for which the (c) post-correction differential signal (H') has been subjected to non-linear conversion, and generates a right-shift image signal (Right) or a left-shift image signal (Left) by means of the following expressions for example.

Right=$S-E'$

Left=$S+E'$

The signals thereby obtained are the right-shift image signals indicated by the solid line in FIG. 14(d) and FIG. 15(d), and the left-shift image signals indicated in FIG. 14(e) and FIG. 15(e).

However, the signals indicated by the dotted line in FIG. 14(d), (e) and FIG. 15(d), (e) correspond to right-shift image signals and left-shift image signals generated using a parallax emphasis signal (E) for which the pre-correction differential signal, in other words the (b) differential signal (H), not the (c) post-correction differential signal, is applied and subjected to non-linear conversion; in other words, the following expressions are established.

Right=$S-E$

Left=$S+E$

If the solid lines and the dotted lines that indicate the (d) right-shift image signal and the (e) left-shift image signal in FIG. 14 and FIG. 15 are compared, in the case where the distance is large depicted in FIG. 14, for both the (d) right-shift image signal and the (e) left-shift image signal, the solid lines (post-correction differential signals) have steeper edge sections (signal change sections) than the dotted lines (pre-correction differential signals), and the signal shift is larger compared to the (a) input signal.

On the other hand, in the case where the distance is small depicted in FIG. 15, for both the (d) right-shift image signal and the (e) left-shift image signal, the solid lines (post-correction differential signals) have smoother edge sections than the dotted lines (pre-correction differential signals), and the signal shift is smaller compared to the (a) input signal.

In this way, the parallax image generating unit 56, with respect to the 2D-RGB image 63 input from the demosaic processing unit 53, executes 2D/3D conversion processing in which the depth map 67 input from the parallax detection unit 55 is used to execute parallax settings corresponding to subject distance, generates a left-eye image (L image) 71 and a right-eye image (R image) 72 that are applicable for 3D image display, and outputs the left-eye image (L image) 71 and the right-eye image (R image) 72 by way of the image output unit 57.

As mentioned above, the image processing unit 17 depicted in FIG. 5 acquires images from different viewpoints that are acquired in accordance with polarizers arranged on the imaging element 16, in other words right-eye-purpose and left-eye-purpose images, and on the basis of these images, generates a depth map that serves as parallax information.

In addition, a normal two-dimensional image is acquired by means of pixels for which polarizers are not arranged, and a high-definition left-eye-purpose image and right-eye-purpose image applicable for 3D image display are output by means of image processing from this information.

It should be noted that, in the abovementioned embodiment, although the first polarization section 12 described with reference to FIG. 1 and so on has been described as a configuration in which a horizontal polarization region is set to the right side and a vertical polarization region is set to the left side, these settings may be reversed.

Furthermore, it is possible to apply a configuration having not only the combination of horizontal polarization and vertical polarization, but also any combination of polarization regions having two different polarization directions, such as polarization regions and so on that allow diagonal-direction polarized light to be transmitted therethrough.

It should be noted that it is necessary for the second polarization section 15 to be made to correspond to the setting of the polarization regions of the first polarization section 12, and to set polarization regions having the same combination as the polarization regions set in the first polarization section 12.

[2. Regarding the Characteristics and Problems of a Wire Grid Polarizer]

As previously described, the polarization regions of the second polarization section 15 depicted in FIG. 1 have a configuration in which a wire grid polarizer for example is used. A wire grid polarizer is a polarization element that has a configuration in which fine wires (Al (aluminum) wire for example) are arranged side by side at small intervals, and exhibits polarization characteristics corresponding to the wire arrangement direction.

The polarization separation characteristics of this wire grid polarizer are influenced by the length of the wire, and there are cases were sufficient polarization characteristics are not exhibited if the wire length is short. Therefore, in order to acquire right-eye-purpose and left-eye-purpose image information in a state in which parallax can be detected, it is necessary for the wire length of a wire grid polarizer set in the second polarization section 15 depicted in FIG. 1 to be maintained to at least a constant length.

However, it is necessary to reduce the optical size of solid-state imaging elements in order to reduce costs and overall size, and reducing the size of single pixels in order to increase the number of pixels is also required.

However, if the pixel size is reduced, in the previously described pixel arrangements depicted in FIG. 2 and FIG. 4 for example, the wire length of the wire grid polarizer in the vertical direction is inevitably shorter.

In other words, in the settings depicted in FIG. 2 and FIG. 4 for example, although the wire length of the wire grid in the horizontal direction can be set to, at most, the lateral length of the imaging element, the wire length of the wire grid polarizer in the vertical direction is inevitably limited to, at most, the length of two pixels.

If such short wires are used, a problem arises in that the polarization separation characteristics worsen.

It is necessary to increase the wire length in order to suppress the deterioration of polarization separation characteristics; however, processing is necessary to set the vertical polarization regions 15V having units of two pixels such as those depicted in FIG. 2 and FIG. 4 for example, to be longer as vertical polarization regions of three or more pixels for example.

However, with this kind of configuration, the number of vertical-direction polarization region pixels (PL pixels) increases, and the number of non-polarization region pixels (N pixels) decreases. As a result, a problem arises in that the performance of interpolation executed in the non-polarized pixel interpolation processing unit 52 depicted in FIG. 5 worsens, and there is a reduction in the image quality of the two-dimensional images that can be generated.

Therefore, in the case where a polarization region setting configuration such as the polarization region setting configuration described with reference to FIG. 1(C) and FIG. 2, and the polarization region setting configuration described with reference to FIG. 3 and FIG. 4 are used, a problem occurs in that it is difficult to (a) ensure the polarization separation characteristics in vertical-direction polarization region pixels (PL pixels), and also to (b) ensure the number of non-polarization region pixels (N pixels).

[3. Regarding an Embodiment in which Wire Grid Polarizers Having Short Wire Lengths are Omitted (Embodiment 2)]

Hereafter, as Embodiment 2 of the image processing device of the present disclosure, an explanation is given with respect to a configuration that solves the abovementioned problems, in other words an exemplary configuration in which wire grid polarizers having short wire lengths for the second polarization section set for the imaging element are omitted.

In order to solve the problem of maintaining the polarization separation characteristics of the abovementioned wire grid polarizer, the image processing device described hereafter has a configuration in which vertical-direction wire grid polarizers are not required; to be specific, a configuration in which the second polarization section 15 in the imaging device depicted in FIG. 1 has only polarization regions (PL pixel regions) that have a horizontal-direction wire grid polarizer arranged therein without a vertical-direction wire grid polarizer, and non-polarization region pixels (N pixels). By implementing this kind of configuration, polarization characteristics are not worsened, and furthermore a sufficient number of non-polarization region pixels (N pixels) is ensured.

In the exemplary configuration described hereafter, the second polarization section does not have regions in which vertical-direction wire grid polarizers are set, and is configured of only polarization regions made up of horizontal-direction wire grid polarizers; therefore, the viewpoint image for either one of the left eye or the right eye cannot be obtained from the regions in which the wire grid polarizers are arranged. However, a left-eye image and a right-eye image for generating parallax information are generated by means of the processing performed by the image processing unit described hereafter, and a depth map is generated on the basis of these generated images.

In addition, it is possible to generate a left-eye image (L image) and a right-eye image (R image) that are applicable for 3D image display, by executing 2D/3D conversion processing based on a high-quality 2D image generated by means of the interpolation processing of an image of non-polarization region pixels (N pixels) having a sufficient number of pixels.

In the configuration described with reference to FIG. 1, vertically polarized light that is transmitted through the vertical polarization region 12V of the first polarization section 12 depicted in FIG. 1(B) is transmitted through the vertical polarization region 15V of the second polarization section 15 depicted in FIG. 1(c), and reaches the vertical polarization region pixels (vertical PL pixels=left-eye pixels (L pixels)) of the imaging device.

Horizontally polarized light that passes through the horizontal polarization region 12H of the first polarization section 12 depicted in FIG. 1(B) is transmitted through the horizontal polarization region 15H of the second polarization section 15 depicted in FIG. 1(C), and reaches the horizontal polarization region pixels (horizontal PL pixels=right-eye pixels (R pixels)) of the imaging device.

As a result, the image captured by the left-eye-purpose pixels constitutes an image which is made up of the transmitted light of the semicircular region of the left half of the first polarization section 12 depicted in FIG. 1(B), and in which the viewpoint that is the center of the optical axis is in the gravity center point 31 of the left semicircular region.

Furthermore, the image captured by the right-eye-purpose pixels constitutes an image which is made up of the transmitted light of the semicircular region of the right half of the first polarization section 12 depicted in FIG. 1(B), and in which the viewpoint that is the center of the optical axis is in the gravity center point 32 of the right semicircular region.

On the other hand, in the non-polarization region pixels (N pixels) in which the wire grid polarizer of the second polarization section 15 depicted in FIG. 1(C) is not arranged, an image is formed which is made up of the transmitted light of the entirety of the first polarization section 12 depicted in FIG. 1(B), and in which the viewpoint that is the center of the optical axis is in the center point 33.

It should be noted that in either case only the light of the regions that is restricted by the aperture 13 arranged at the stage after the first polarization section 12 is transmitted.

That is, the non-polarization region pixels (N pixels) of the imaging element 16 acquire light produced by adding the transmitted light of the two regions of the semicircular region of the left half of the first polarization section 12 and the semicircular region of the right half of the first polarization section 12.

In other words, if the reception-light signal of the horizontal polarization region pixels (horizontal PL pixels=right-eye pixels (R pixels)) of the imaging element is taken as PL(R), the reception-light signal of the vertical polarization region pixels (vertical PL pixels=left-eye pixels (L pixels)) of the imaging element is taken as PL(L), and the reception-light signal of the non-polarization region pixels (N pixels) of the imaging element is taken as N, the following relational expression is established.

$$N=PL(R)+PL(L) \quad \text{(expression 1)}$$

The configuration of the second polarization section 15 in the present embodiment is described with reference to FIG. 16 and FIG. 17.

It should be noted that, in the present embodiment also, the overall configuration of the imaging device is the configuration depicted in FIG. 1.

However, the configuration of the second polarization section 15 and the configuration and processing of the image processing unit 17 are different.

Figure 16:
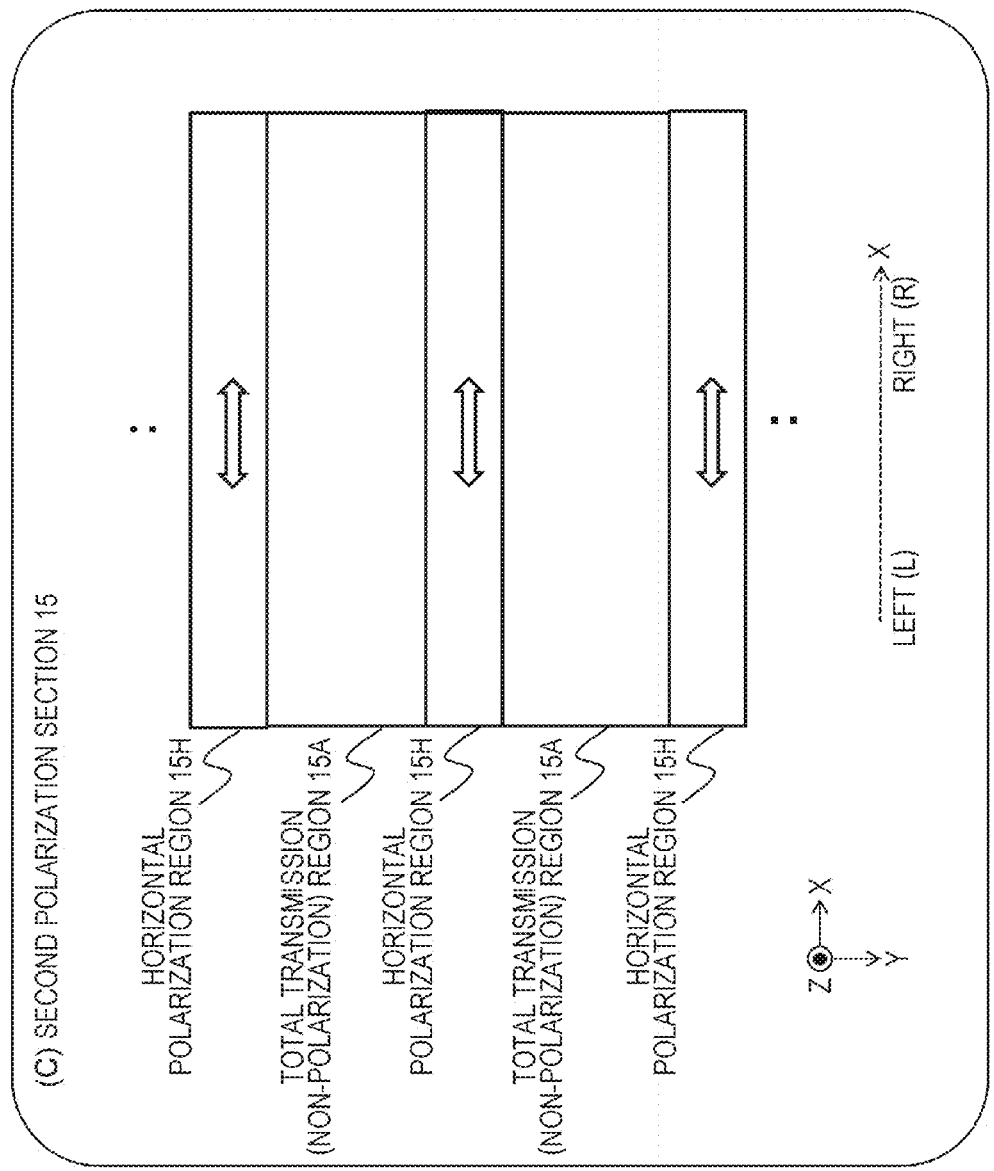
FIG. 16 is a drawing illustrating an exemplary configuration of a second polarization section.

FIG. 16 depicts the configuration of the second polarization section 15 of the imaging device in the present embodiment.

As depicted in FIG. 16, the second polarization section 15 has a configuration in which the two regions of the horizontal polarization region 15H and the total transmission (non-polarization) region 15A are repeatedly arranged in the vertical direction.

Figure 17:
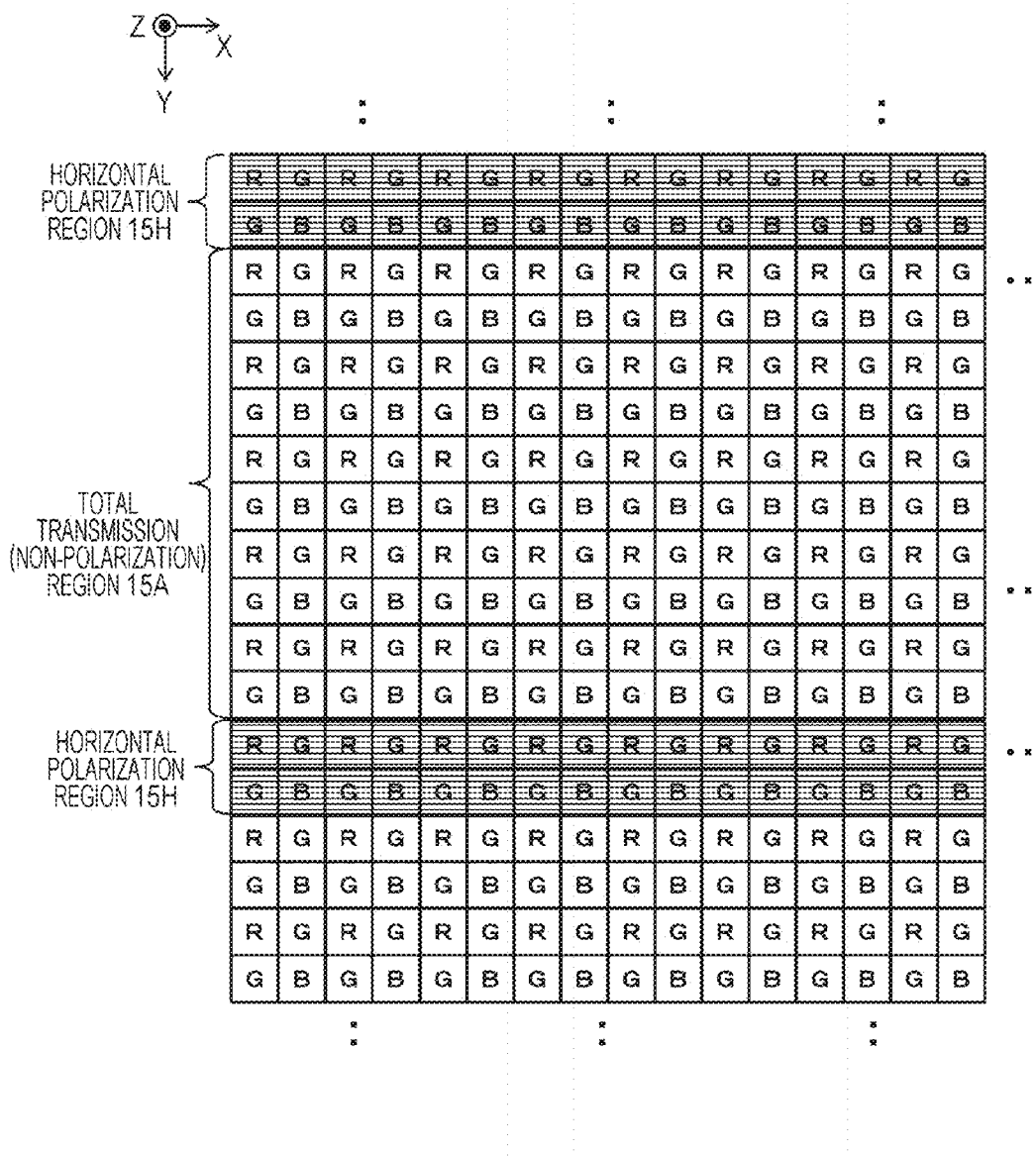
FIG. 17 is a drawing illustrating an exemplary configuration of a second polarization section and an imaging element.

FIG. 17 is a drawing in which the second polarization section 15 and the imaging element 16 that receives the transmitted light of the second polarization section 15 are superimposed. With regard to the imaging element 16, an imaging element having an RGB array (Bayer array) is depicted as an example.

The exemplary configuration depicted in FIG. 17 is an example in which the horizontal polarization region 15H set in the second polarization section 15 is set in units of two lines of the imaging element, and the total transmission (non-polarization) region 15A is set in units of 10 lines. In other words, these two types of regions of the (a) two-line horizontal polarization region 15H, and the (b) 12-line total transmission (non-polarization) region 15V are repeatedly set in the vertical direction (Y direction) of the imaging element 16.

The horizontal polarization region 15H selectively transmits only horizontal-direction polarized light, in other words an R image (horizontally polarized light) corresponding to a right-eye image transmitted through the horizontal polarization region 12H depicted in FIG. 1(B), and causes a right-eye image (R image) to be formed by the imaging element 16.

The total transmission (non-polarization) region 15A allows transmission of both images of an R image (horizontally polarized light) corresponding to a right-eye image transmitted through the horizontal polarization region 12H depicted in FIG. 1(B), and an L image (vertically polarized light) corresponding to a left-eye image transmitted through the vertical polarization region 12V depicted in FIG. 1(B). These images are images that correspond to an image seen from a center point 33 which is the center location between the gravity center point 31 and the gravity center point 32 depicted in FIG. 1(B). In other words, these images constitute an image which is the same as a normal image in which there is no viewpoint deviation caused by the influence of polarization.

In this configuration, the vertical polarization region 15V present in the configuration described with reference to FIG. 2 and FIG. 4 is not provided.

In other words, in the example depicted in FIG. 17, horizontal-direction wire grid polarizers are arranged only in the horizontal polarization regions 15H having two horizontal lines. In the case of a horizontal-direction wire grid, the wire length can be extended to, at most, the horizontal size of the image sensor, and it is possible for polarization separation characteristics to be improved.

If the second polarization section 15 having the polarization regions described with reference to FIG. 16 and FIG. 17 set therein is used to capture images in the imaging device 10 depicted in FIG. 1, images such as the following are captured in the regions in the imaging element 16.

The horizontal polarization region 15H=an R image (horizontally polarized light) corresponding to a right-eye image in which the gravity center point 32 transmitted through the horizontal polarization region 12H depicted in FIG. 1(B) serves as the viewpoint.

The total transmission (non-polarization) region 15A=an image seen from the center point 33 transmitted through the horizontal polarization region 12H and the vertical polarization region 12V depicted in FIG. 1(B).

In other words, if the reception-light signal of the horizontal polarization region pixels (horizontal PL pixels=right-eye pixels (R pixels)) of the imaging element is taken as PL(R), the reception-light signal of the non-polarization region pixels (N pixels) of the imaging element is taken as N, and the reception-light signal of the vertical polarization region pixels (vertical PL pixels=left-eye pixels (L pixels)), for which light is not received by the imaging element, is taken as PL(L), the following relational expression is established.

$$PL(L)=N-PL(R) \quad \text{(expression 2)}$$

In other words, as in the above expression 2, a left-eye image signal can be obtained from the image signal of the non-polarization region pixels (N pixels) and the right-eye image signal (PL(R)).

In the imaging device of the present embodiment, in the image processing unit 17 of the imaging device 100 depicted in FIG. 1, in accordance with the abovementioned relational expression, a left-eye image signal is calculated from the image signal of the non-polarization region pixels (N pixels) and the right-eye image signal (PL(R)), and a depth map serving as parallax information is generated on the basis of this calculated signal.

The overall configuration of the imaging device according to the present embodiment is the same configuration as depicted in FIG. 1(A).

However, the configuration of the second polarization section 15 and the configuration and processing of the image processing unit 17 are different.

As described with reference to FIG. 16 and FIG. 17, the second polarization section 15 has a configuration which does not include a vertical-direction wire grid polarizer, and in which a polarization region (PL pixel region) that has a horizontal-direction wire grid polarizer arranged therein in units of s rows (s=2 in FIG. 17), and a non-polarization region (N pixel region) that has non-polarization region pixels (N pixels) arranged therein in units of t rows (t=10 in FIG. 17) are repeatedly arranged in the vertical direction of the imaging element.

By implementing this kind of configuration, the polarization characteristics are not worsened, and furthermore a sufficient number of non-polarization region pixels (N pixels) is ensured.

In the imaging element 16, the following two images are acquired in the regions.

In the polarization region (PL pixel region) pixels for which a wire grid polarizer is arranged, a right-eye image is acquired in which the gravity center point 32 that is transmitted through the horizontal polarization region 12H of the right side of the first polarization section 12 depicted in FIG. 1(B) serves as the viewpoint.

On the other hand, in the non-polarization region (N pixel region) pixels that are pixels for which a wire grid polarizer is not arranged, a normal image is acquired in which the gravity center point 33 that is transmitted through both the vertical polarization region 12V of the left side and the horizontal polarization region 12H of the right side of the first polarization section 12 depicted in FIG. 1(B) serves as the viewpoint.

That is, in the imaging element 16, the polarization region (PL pixel region) pixels, for which a wire grid polarizer is arranged, of the second polarization section 15 acquire a left-eye image in which the gravity center point 32 depicted in FIG. 1(B) serves as the viewpoint, and the non-polarization region (N pixel region) pixels for which a wire grid polarizer is not arranged acquire a normal image in which the center point 33 depicted in FIG. 1(B) serves as the viewpoint.

Figure 18:
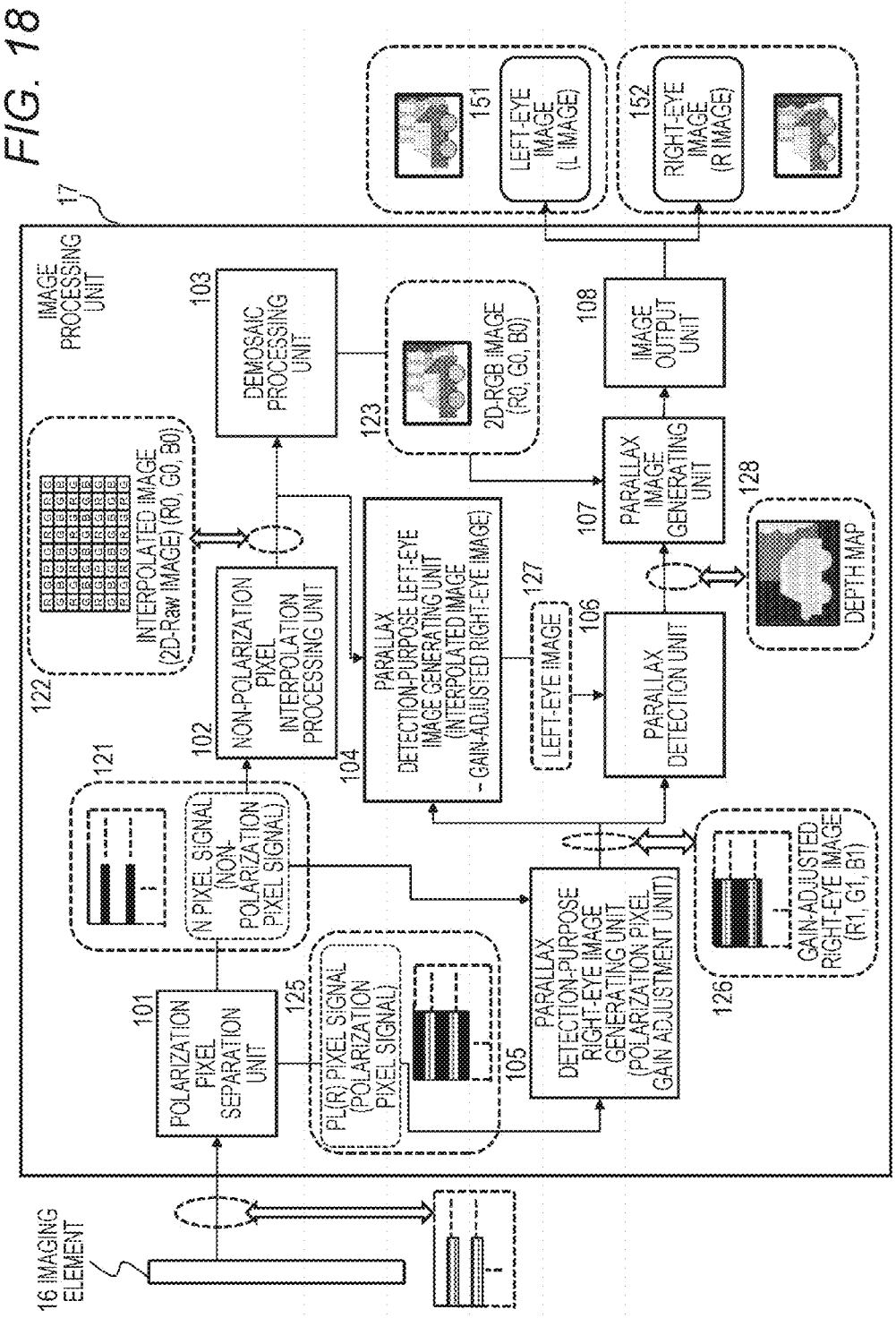
FIG. 18 is a drawing illustrating an exemplary configuration of an image processing unit of an image processing device of the present disclosure.

FIG. 18 is a diagram depicting the configuration of the image processing unit 17 of the present embodiment.

As described with reference to FIG. 16 and FIG. 17, the imaging element 16 is divided into the two types of regions of (a) a horizontal polarization region and (b) a total transmission (non-polarization) region, and signals corresponding to each of these regions are input to the image processing unit 17.

In the pixels of the imaging element 16 corresponding to the horizontal polarization regions, a left-eye image is captured in which the gravity center point 32 of the first polarization section 12 of FIG. 1(B) serves as the viewpoint.

In the pixels of the imaging element 16 corresponding to the total transmission (non-polarization) region, a normal image is captured in which the center point 33 of the first polarization section 12 of FIG. 1(B) serves as the viewpoint.

It should be noted that the pixels of the imaging element 16 corresponding to horizontal polarization regions are referred to as PL(R) pixels.

The pixels of the imaging element 16 corresponding to the non-polarization region pixels (N pixels) are referred to as N pixels.

With regard to pixel signals output from the imaging element 16 depicted in FIG. 18, separation processing of the output of the polarization region pixels (PL(R) pixels) and the non-polarization region pixels (N pixels) is executed in the polarized pixel separation unit 101 of the image processing unit 17.

An N pixel signal (non-polarized pixel signal) 121 separated by means of the separation processing performed by the polarized pixel separation unit 101 is input to the non-polarized pixel interpolation processing unit 102.

The non-polarized pixel interpolation processing unit 102 executes pixel interpolation processing for pixel regions missing from the N pixel signal (non-polarized pixel signal) 121, in other words for pixels of PL(R) pixel regions. To be specific, interpolation processing is executed in which, for example, the pixel values of a PL(R) pixel region are calculated and set with reference to the pixel values of N pixels thereabove and therebelow.

By means of this pixel interpolation processing, the pixel values of all of the PL(R) pixel regions having missing pixel values are set, and an interpolated image (2D raw image) 122 having the same number of pixels as the input image is generated. As pixel interpolation processing, it is possible to use a method for carrying out linear interpolation processing for each color, and a method for carrying out direction selection-type interpolation processing in which the interpolation direction is selected in accordance with a brightness gradient generated from color signals.

It should be noted that the raw image is an image in which pixel values of any of RGB are set for the pixels.

The interpolated image (2D raw image) 122 generated by the non-polarized pixel interpolation processing unit 102 is an image in which N image signals (non-polarization image signals) are set for all of the pixels of the constituent pixels of the imaging element 16. This image is one 2D (two-dimensional) raw image corresponding to an image observed from the center point 33 of the first polarization section 12 depicted in FIG. 1(B).

The interpolated image (2D raw image) 122 generated by the non-polarized pixel interpolation processing unit 102 is input to a demosaic processing unit 103.

The demosaic processing unit 103 carries out demosaic processing for the interpolated image (2D raw image) 122 as well as other camera signal processing, and carries out conversion to a normal two-dimensional image.

The demosaic processing is processing in which in all color signals, pixel values of RGB colors for example, are set in all pixel locations, and is processing which is carried out in a general camera.

A 2D-RGB image 123 generated by the demosaic processing unit 103 is input to a parallax image generating unit 107.

It should be noted that the RGB pixel values of the pixels making up the 2D-RGB image 123 that is a 2D image generated on the basis of N pixel signals (non-polarized pixel signals) are written as (R0,B0,G0).

Meanwhile, a PL(R) pixel signal (polarized pixel signal) 125, which is another separated signal generated by means of the separation processing carried out by the polarized pixel separation unit 101, is an image signal that does not have pixel values of non-polarization region pixels (N pixels), and is made up of only pixel signals of polarization region pixels (PL(R) pixels).

This PL(R) pixel signal (polarized pixel signal) 125 is input to the parallax detection-purpose right-eye image generating unit (polarized pixel gain adjustment unit) 105.

The parallax detection-purpose right-eye image generating unit (polarized pixel gain adjustment unit) 105 also inputs the N pixel signal (non-polarized pixel signal) 121 which is another separated signal generated by the polarized pixel separation unit 101.

The parallax detection-purpose right-eye image generating unit (polarized pixel gain adjustment unit) 105 carries out gain adjustment processing in which the brightness of the PL(R) pixel signal (polarized pixel signal) 125 is adjusted and made to match the brightness of the N pixel signal (non-polarized pixel signal). In other words, the PL(R) pixels are set so as to have approximately the same average and distribution (standard deviation) as the normal N pixels.

As depicted in FIG. 19(A), the PL(R) pixels of the imaging element are signals that have been transmitted through the semicircular region of the horizontal polarization region 12H of the first polarization section 12 depicted in FIG. 1(B), while the N pixels of the imaging element are signals that have been transmitted through of the entirety (circular region) of the first polarization section 12.

Therefore, as depicted in FIG. 19(B), an image is formed in which the average brightness levels of the PL(R) pixels and the N pixels of the imaging element are different.

The parallax detection-purpose right-eye image generating unit (polarized pixel gain adjustment unit) 105 carries out adjustment processing in which the brightness level of the PL(R) pixels having a wire grid polarizer arranged thereon is adjusted, and approximately the same average brightness and distribution (standard deviation) as the brightness level of the normal N pixels are maintained for example. A gain-adjusted right-eye image 126 is generated as a result of this adjustment, and is output to the parallax detection unit 106 and the parallax detection-purpose left-eye image generating unit 104.

A detailed example of gain processing is described at a later stage.

It should be noted that the pixel values of the gain-adjusted right-eye image 126 subsequent to the gain processing of the PL(R) pixels on which a wire grid polarizer is arranged are written as (R1, G1, B1).

The parallax detection-purpose left-eye image generating unit 104 has input thereto the interpolated image (2D raw image) 122 generated by the non-polarized pixel interpolation processing unit 102, and the gain-adjusted right-eye image 126 generated by the parallax detection-purpose right-eye image generating unit (polarized pixel gain adjustment unit) 105.

The pixel values of the interpolated image (2D raw image) 122 generated by the non-polarized pixel interpolation processing unit 102 are (R0, G0, B0), and the pixel values of the gain-adjusted right-eye image 126 generated by the parallax detection-purpose right-eye image generating unit (polarized pixel gain adjustment unit) 105 are (R1, G1, B1).

In the parallax detection-purpose left-eye image generating unit 104, the previously described expression 2, in other words:

$$PL(L)=N-PL(R) \qquad \text{(expression 2)}$$

is established, wherein the reception-light signal of the horizontal polarization region pixels (horizontal PL pixels=right-eye pixels (R pixels)) of the imaging element is PL(R), the reception-light signal of the non-polarization region pixels (N pixels) of the imaging element is N, and the reception-light signal of the vertical polarization region pixels (vertical PL pixels=left-eye pixels (L pixels)), for which light is not received by the imaging element, is PL(L).

In accordance with the abovementioned expression 2, left-eye image pixel values (R2, G2, B2) are calculated from the pixel values (R0, G0, B0) of the interpolated image (2D raw image) 122 generated by the non-polarized pixel interpolation processing unit 102, and the pixel values (R1, G1, B1) of the gain-adjusted right-eye image 126 generated by the parallax detection-purpose right-eye image generating unit (polarized pixel gain adjustment unit) 105.

For example, the left-eye image pixel value (R2) is calculated in accordance with the following expression 3.

$$R2 = 2 \times R0 - R1 \quad \text{(expression 3)}$$

It should be noted that the reason for the multiplication by 2 in the abovementioned expression 3 is because the pixel value (R1) of the gain-adjusted right-eye image 126 has a brightness that is subsequent to gain adjustment, adjustment for a brightness level that corresponds to the received light of an approximately circular region is carried out from the semicircular region by means of the gain adjustment previously described with reference to FIG. 19, and the brightness level is adjusted to be approximately doubled.

By doubling the brightness (R0) of the interpolated image (2D raw image) 122 generated by the non-polarized pixel interpolation processing unit 102, and subtracting the pixel value (R1) of the gain-adjusted right-eye image 126, it is possible to calculate the pixel value (R2) of a left-eye image that has been subjected to the same gain adjustment.

The same subtraction processing is carried out also for other color components, and the pixel values (R2, G2, B2) of the left-eye image are calculated.

A specific example of the processing executed by the parallax detection-purpose left-eye image generating unit 104 is described with reference to FIG. 20.

Figure 20:
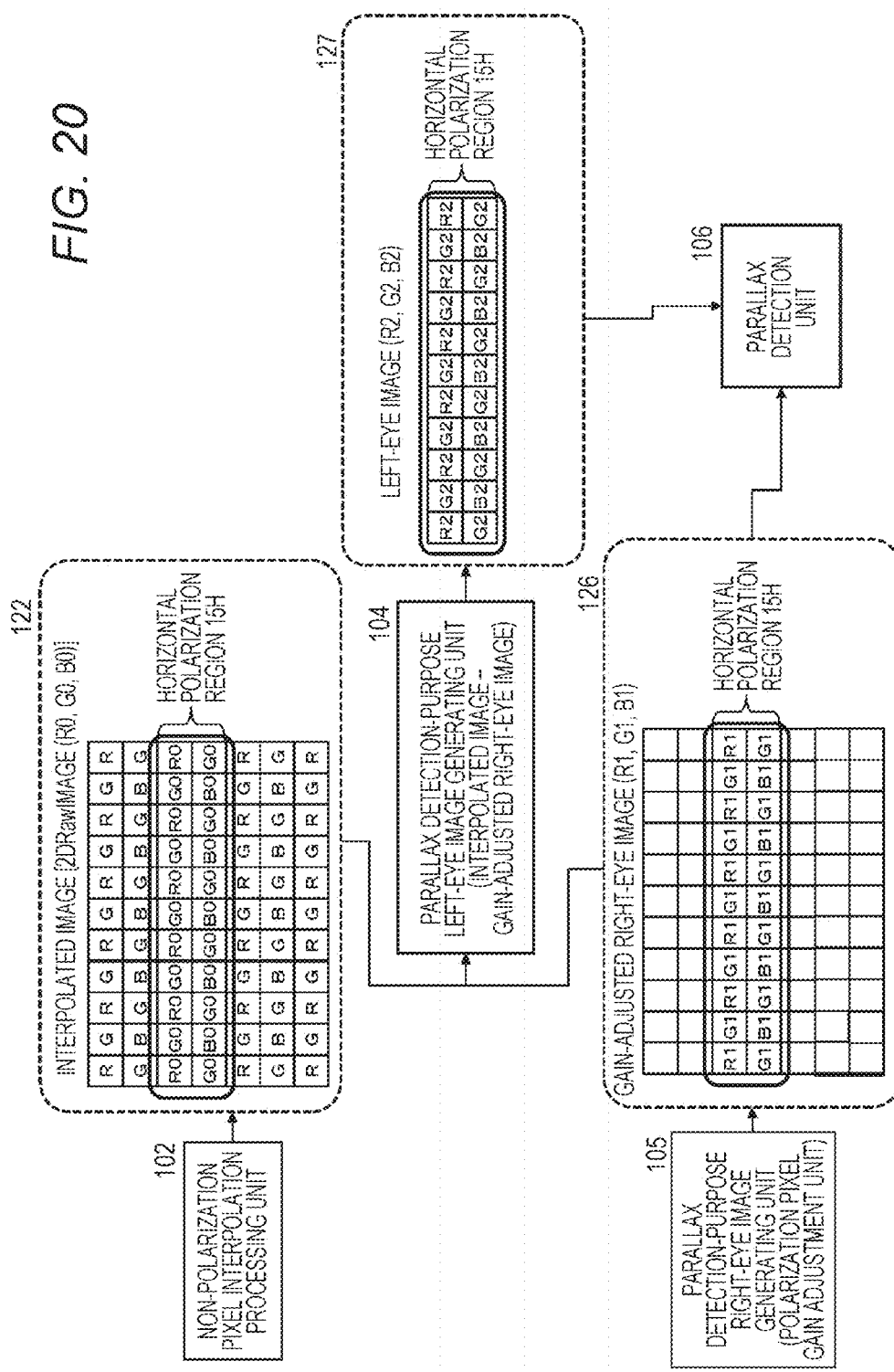
FIG. 20 is a drawing illustrating processing executed by a parallax detection-purpose left-eye image generating unit.

FIG. 20 depicts the interpolated image (2D raw image) 122 generated by the non-polarized pixel interpolation processing unit 102 and the gain-adjusted right-eye image 126 generated by the parallax detection-purpose right-eye image generating unit (polarized pixel gain adjustment unit) 105.

The parallax detection-purpose left-eye image generating unit 104 has this image data input thereto, uses the corresponding pixel locations, in other words the RGB pixel values set in the horizontal polarization region 15H, and calculates the pixel values (R2, G2, B2) of the left-eye image 127 in accordance with the abovementioned expression 3.

It should be noted that, as is apparent from the drawings, the pixel region that is targeted for calculation of the pixel values (R2, G2, B2) for the left-eye image 127 is a pixel region that is included in the gain-adjusted right-eye image 126 generated by the parallax detection-purpose right-eye image generating unit (polarized pixel gain adjustment unit) 105, and is made up of only pixels of the horizontal polarization region 15H.

In accordance with the abovementioned expression 3 and so on, the parallax detection-purpose left-eye image generating unit 104 calculates the pixel values (R2, G2, B2) for the left-eye image 127 by subtracting, from the pixel values (R0, G0, B0) of the interpolated image (2D raw image) 122, the pixel values (R1, G1, B1) of the gain-adjusted right-eye image 126 at corresponding locations.

The left-eye image 127 generated by the parallax detection-purpose left-eye image generating unit 104 is input to the parallax detection unit 106.

The parallax detection unit 106 has input thereto the two different viewpoint images of the gain-adjusted right-eye image 126 generated by the parallax detection-purpose right-eye image generating unit (polarized pixel gain adjustment unit) 105, and the left-eye image 127 generated by the parallax detection-purpose left-eye image generating unit 104.

With respect to the two different viewpoint images of the gain-adjusted right-eye image 126 generated by the parallax detection-purpose right-eye image generating unit (polarized pixel gain adjustment unit) 105, and the left-eye image 127 generated by the parallax detection-purpose left-eye image generating unit 104, the parallax detection unit 106 uses block matching processing or the like to obtain corresponding pixels and thereby detect subject distance as parallax information.

In other words, by means of block matching processing for example, deviation between pixels of the left-eye image and the right-eye image is detected, and subject distance corresponding to the amount of deviation is calculated.

The parallax detection unit 106, for example, generates and outputs a depth map 128 containing subject distance information corresponding to pixels.

It should be noted that the depth map 128 is data containing subject distance information for each of the constituent pixels of an image. For example, the depth map is configured as an image in which brightness values corresponding to subject distance are set.

To be specific, regions having a small subject distance (near to the camera) have high brightness, and regions having a large subject distance (far away from the camera) have low brightness for example, and the parallax detection unit 106 generates a depth map in which these kinds of pixel value settings have been performed, and outputs the depth map to the parallax image generating unit 107.

It should be noted that, with regard to the images of the gain-adjusted right-eye image 126 generated by the parallax detection-purpose right-eye image generating unit (polarized pixel gain adjustment unit) 105, and the left-eye image 127 generated by parallax detection-purpose left-eye image generating unit 104, as depicted in FIG. 20, N pixel (non-polarized pixel) regions in the input images do not have image signals; however, the parallax detection unit 106 calculates a right-eye image in which interpolated pixel values for the right-eye image are set to N pixel regions on the basis of the gain-adjusted right-eye image 126, and a left-eye image in which interpolated pixel values for the left-eye image are set to N pixel regions on the basis of the left-eye image 127 generated by the parallax detection-purpose left-eye image generating unit 104, and calculates distance information corresponding to all of the pixels by performing matching processing between these images.

It should be noted that, in the pixel value interpolation processing, linear interpolation processing and the like can be used for example.

Alternatively, in the present exemplary configuration also, a depth map may be generated in accordance with the processing previously described with reference to FIG. 7 and FIG. 8. In other words, the parallax detection unit 106 may have a configuration in which a depth map 128 containing distance information (depth information) of all of the pixel regions is generated by expanding the application of the distance information (depth information) in the polarization regions to the non-polarization regions as previously described with reference to FIG. 8.

In this way, from the two images (right-eye image and left-eye image), the parallax detection unit 106 calculates the amount of deviation in the horizontal direction in corresponding locations of each image, and outputs the depth map 128. It should be noted that methods such as a block matching method in which the sum of the absolute differences of blocks including the pixels is minimized, and dynamic programming in which matching between the same lines of a generated image 1 and a generated image 2 is optimized, are used for the detection of corresponding locations of the images.

The parallax image generating unit 107 uses the 2D-RGB image 123 which is a two-dimensional image output from the demosaic processing unit 103, and the depth map 128 serving as parallax information output from the parallax detection unit 106 to generate the two images of a left-eye image (L image) 151 and a right-eye image (R image) 152.

In other words, image conversion processing in which parallax corresponding to subject distance is set on the basis of the depth map 128 serving as parallax information is carried out with respect to the 2D-RGB image 123, and a left-eye image (L image) 151 and a right-eye image (R image) 152 are generated and output.

It should be noted that this image conversion processing executed in the parallax image generating unit 107 is processing in which a left-eye image (L image) 151 and a right-eye image (R image) 152 that are applicable for three-dimensional image display are generated and output by means of image conversion based on a single two-dimensional image (2D image), and the same 2D/3D conversion processing as that of the parallax image generating unit 56 in the image processing unit 17 previously described with reference to FIG. 5 is executed.

For example, the 2D/3D conversion processing described with reference to FIG. 9 to FIG. 15 can be applied. It should be noted that other known 2D/3D conversion processing may be carried out.

The left-eye image (L image) 151 and the right-eye image (R image) 152 that are generated by the parallax image generating unit 107 and are applicable for 3D image display are output by way of the image output unit 108.

In this way, in the present embodiment, a depth map is generated by detecting parallax using a right-eye-purpose image that is acquired by means of a wire grid polarizer arranged on the imaging element 16, and a left-eye-purpose image that is generated by means of subtraction processing with a normal N image for which a wire grid polarizer is not arranged.

The configuration of Embodiment 2 is a configuration in which the second polarization section 15 in the imaging device depicted in FIG. 1 has only polarization regions (PL pixel regions) that have a horizontal-direction wire grid polarizer arranged therein without a vertical-direction wire grid polarizer, and non-polarization region pixels (N pixels). By implementing this kind of configuration, the polarization characteristics are not worsened, and furthermore a sufficient number of non-polarization region pixels (N pixels) is ensured.

It should be noted that, in the abovementioned embodiment, although the first polarization section 12 described with reference to FIG. 1 and so on has been described as a configuration in which a horizontal polarization region is set to the right side and a vertical polarization region is set to the left side, these settings may be reversed.

Furthermore, it is possible to apply a configuration having not only the combination of horizontal polarization and vertical polarization, but also any combination of polarization regions having two different polarization directions, such as polarization regions and so on that allow diagonal-direction polarized light to be transmitted therethrough.

It should be noted that it is necessary for the second polarization section 15 to be made to correspond to the setting of the polarization regions of the first polarization section 12, and to set the same polarization regions as one polarization section of the polarization regions set in the first polarization section 12.

Next, the details of the gain processing executed in the parallax detection-purpose right-eye image generating unit 105 of the image processing unit 17 depicted in FIG. 18 are described with reference to FIG. 21 and thereafter.

As previously mentioned, the parallax detection-purpose right-eye image generating unit (polarized pixel gain adjustment unit) 105 carries out gain adjustment processing in which the brightness of a PL(R) pixel signal (polarized pixel signal) 125 is made to match the brightness level of an N pixel signal (non-polarized pixel signal).

The PL(R) pixels of the imaging element are signals that have been transmitted through the semicircular region of the horizontal polarization region 12H of the first polarization section 12 depicted in FIG. 1(B), while the N pixels of the imaging element are signals that have been transmitted through the entirety (circular region) of the first polarization section 12.

Figure 19:
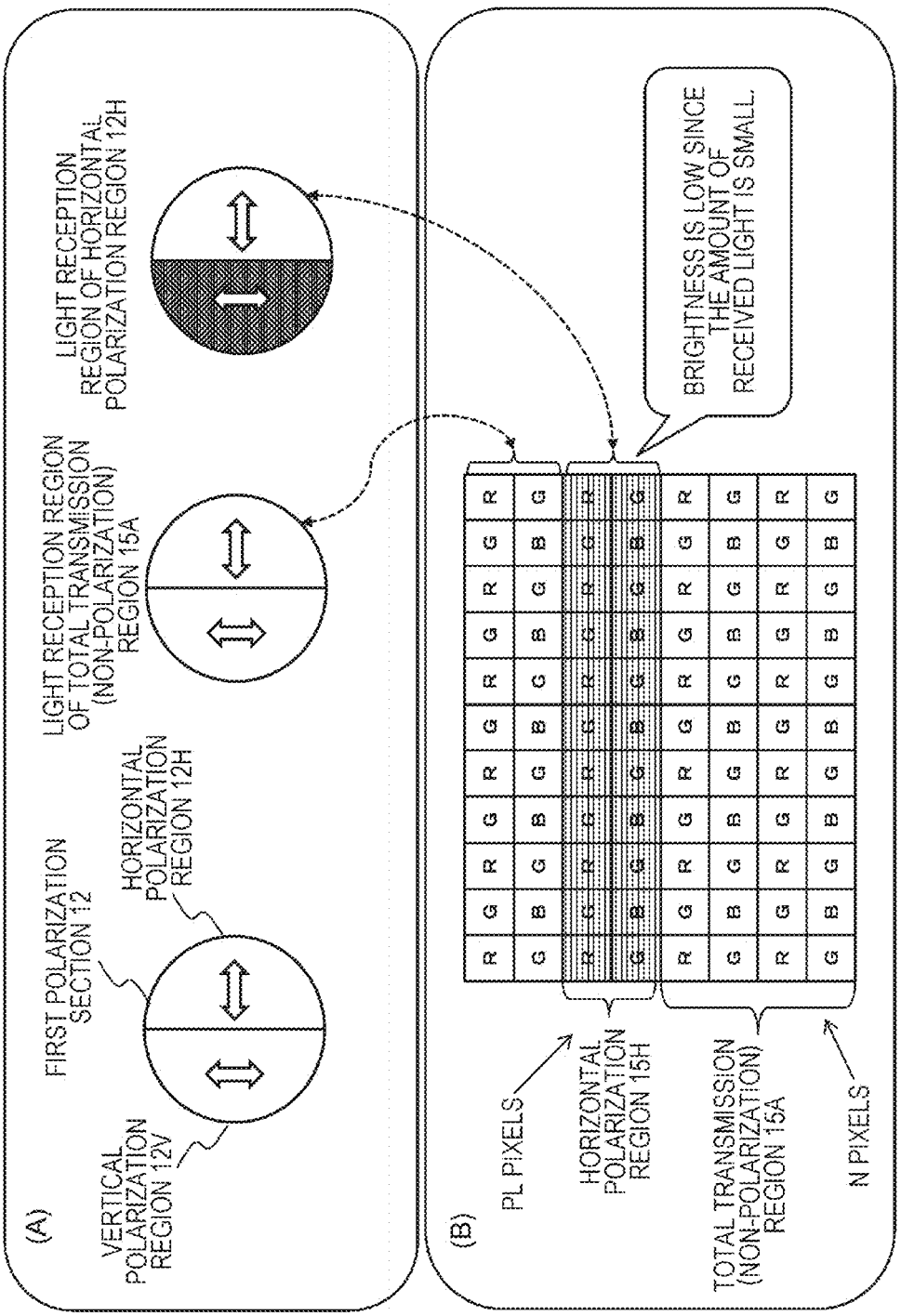
FIG. 19 is a drawing illustrating processing executed by a parallax detection-purpose right-eye image generating unit.

Therefore, as depicted in FIG. 19, the PL(R) pixels of the imaging element have a brightness level that is half that of the N pixels; however, due to the first polarization section and the characteristics of the second polarization section, the brightness level of the PL(R) pixels is not always half that of the N pixels. Gain adjustment processing is executed in order to correct this discrepancy in brightness.

The parallax detection-purpose right-eye image generating unit (polarized pixel gain adjustment unit) 105 carries out gain processing in which, for example, the average brightness level of the PL(R) pixels for which a wire grid polarizer is arranged becomes approximately the same average brightness level of the normal N pixels, and a gain-adjusted right-eye image 126 is generated and output to the parallax detection unit 106 and the parallax detection-purpose left-eye image generating unit 104.

Processing example 1 for adjustment processing executed by the parallax detection-purpose right-eye image generating unit (polarized pixel gain adjustment unit) 105 is described with reference to FIG. 21 and FIG. 22.

In processing example 1, normalization is carried out in such a way that the averages and standard deviations across the whole image for each color are obtained with respect to N pixels and PL pixels, and the averages and standard deviations for the colors of the normal N pixels and the averages and standard deviations for the colors of the PL pixels become the same. By means of this processing, PL(R) pixels for which a wire grid polarizer is arranged are set in such a way as to have approximately the same averages and distributions (standard deviations) as the normal N pixels.

To be specific, as depicted in FIG. 21, with regard to non-polarized pixels (N pixels) and polarized pixels (PL pixels), the averages and standard deviations across the whole image are obtained for the three types of pixels of [G,B,R] according to color, or the four types of pixels of [Gr,Gb,B,R] for which the G pixel are distinguished by being adjacent to an R pixel or being adjacent to a B pixel.

For example, in the processing for the four types of pixels of [Gr,Gb,B,R], first, the average and standard deviation are obtained for the colors [Gr,Gb,B,R] of the non-polarized pixels (N pixels), in other words NGr, NGb, NB, and NR.

Similarly, the average and standard deviation are obtained for the colors [Gr,Gb,B,R] of the polarized pixels (PL(R) pixels), in other words PL(R)Gr, PL(R)Gb, PL(R)B, and PL(R)R.

Additionally, normalization is carried out in such a way that the averages and standard deviations are the same among the corresponding PL(R)Gr and NGr, PL(R)Gb and NGb, PL(R)B and NB, and PL(R)R and NR.

FIG. 22 is a drawing depicting a specific example of normalization processing for the average and standard deviation of colors.

For example, FIG. 22(a) depicts comparison data of: non-polarized pixel (N pixel) measured data 201 for the average and standard deviation of one color of the non-polarized pixels (N pixels), NGr pixels for example; and polarized pixel measured data 202 for the average and standard deviation of PL(R)Gr pixels that are the corresponding colors for the polarized pixels (PL(R) pixels).

The parallax detection-purpose right-eye image generating unit (polarized pixel gain adjustment unit) 105 carries out processing in which the average and standard deviation of the polarized pixel measured data 202 depicted in FIG. 22(a) are made to match the non-polarized pixel (N pixel) measured data 201. In other words, as depicted in FIG. 22(b), first of all, processing is carried out in which the average brightness of the PL(R) pixels serves as an offset 1, and the offset 1 is subtracted. If the magnitude of the offset 1 is taken as F1, the brightness $I_{PL1}$ of a PL pixel after the offset 1 has been subtracted is expressed by the following expression. Here, $I_{PL}$ is the brightness value of a PL pixel.

$$I_{PL1} = I_{PL} - F1$$

Next, multiplication by a gain value is carried out in order for the standard deviation of the brightness of the PL(R) pixels and the standard deviation of the brightness of the N pixels to be made to match. Here, if the gain value is taken as E, the brightness $I_{PL2}$ of a PL pixel after gain adjustment is expressed by the following expression.

$$I_{PL2} = I_{PL1} \times E$$

Following on, processing in which an offset 2 that is the average brightness of the N pixels is added is carried out in order to make the average brightness of the PL(R) pixels match the average brightness of the N pixels. If the magnitude of the offset 2 is taken as F2, the brightness $I_{PL3}$ of a PL pixel after the offset 2 is added is expressed by the following expression.

$$I_{PL3} = I_{PL2} + F2$$

The parallax detection-purpose right-eye image generating unit (polarized pixel gain adjustment unit) 105 executes processing according to this processing example 1 for example, and the brightness of the PL(R) pixels for which a wire grid polarizer is arranged is set so as to have approximately the same average and distribution (standard deviation) as the brightness of the normal N pixels.

Next, processing example 2, which is another example of the processing executed by the parallax detection-purpose right-eye image generating unit (polarized pixel gain adjustment unit) 105, is described with reference to FIG. 23.

In processing example 2, the pixel value (brightness) of a PL(R) pixel for which a wire grid polarizer is arranged is adjusted by means of the following processing.

The parallax detection-purpose right-eye image generating unit (polarized pixel gain adjustment unit) 105 selects processing-target pixels from the polarized pixels (PL(R) pixels) one at a time and carries out processing.

Figure 23:
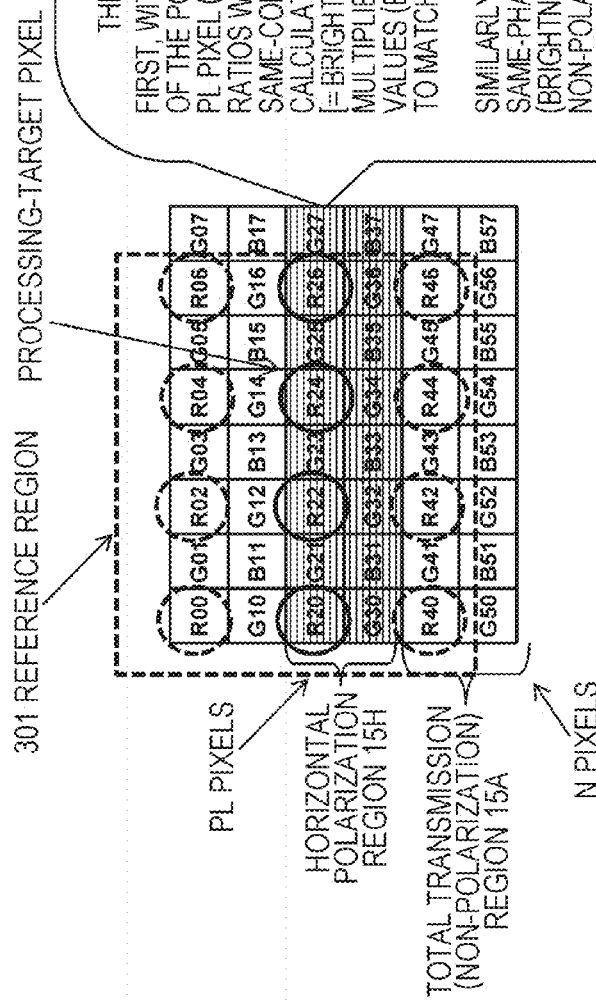
FIG. 23 is a drawing illustrating processing executed by a parallax detection-purpose right-eye image generating unit.

As an example, a case is described where one pixel (R24) from within the horizontal polarization region 15H depicted in FIG. 23 is the processing target.

First, pixels that are proximate to and have the same color as the processing-target pixel (R24) are selected from the non-polarization regions. In other words, the non-polarization region pixels (N pixels) that are nearest to the processing-target pixel (R24) and correspond to the same color component (R) are selected.

In the present example, R04 and R44 depicted in FIG. 23 are selected.

Next, brightness ratios (E04 and E44) for the selected proximal same-color pixels R04, R44 are calculated by means of the following expression.

$$E = I_N / I_{PL} \quad \text{(expression 4)}$$

In the abovementioned expression 4, $I_N$ represents the brightness value of an N pixel, and $I_{PL}$ represents the brightness value of a PL pixel.

For example, if the brightness value of the processing-target pixel (R24) is taken as R24, the brightness value of R04 is taken as R04, and the brightness value of R44 is taken as R44, the brightness ratios of $$E04 = R04/R24$$

and $$E44 = R44/R24$$

are calculated.

Hereafter, the ratios for peripheral adjacent same-color components are calculated in the same way. For example, the six ratios of ratio E00 of R20 and R00, ratio E40 of R20 and R40, ratio E02 of R22 and R02, ratio E42 of R22 and R42, ratio E06 of R26 and R06, and ratio E46 of R26 and R46 are calculated. In addition to this, the calculation of a center value is carried out with respect to the eight ratios including the two ratios E04 and E44.

This center value is determined as a gain value E.

The brightness $I_{PL3}$ of a PL pixel subsequent to gain processing according to this processing example 2 is expressed by the following expression:

$$I_{PL3} = I_{PL} \times E \quad \text{(expression 5)}$$

wherein, $I_{PL}$ is the brightness of the PL pixel prior to gain processing, and $I_{PL3}$ is the brightness of the PL pixel subsequent to gain processing.

The parallax detection-purpose right-eye image generating unit (polarized pixel gain adjustment unit) 105 selects processing-target pixels one at a time from the polarized pixels (PL(R) pixels), and adjusts the brightness of all of the polarized pixels (PL(R) pixels) in accordance with the abovementioned expression 5.

It should be noted that, in the abovementioned processing example, an example has been described in which a 7×5-pixel reference region 301 is set as depicted in FIG. 23, as pixels that are referenced in order to adjust the brightness of the processing-target pixel R24 for example. In other words, although a processing example in which the brightness ratios of four PL pixels and eight N pixels included in the reference region 301 are calculated to obtain a gain E is described, this setting example for the reference region is one example, and may have a configuration in which a wider reference region or a narrower reference region is set.

In this way, in processing example 2, processing-target pixels are selected one at a time from the polarized pixels (PL(R) pixels), the brightness ratios between the polarized pixels (PL(R) pixels) and the non-polarized pixels (N pixels) of the same color included in the reference region are calculated, and with the center value thereof serving as the gain E, the brightness values of all of the polarized pixels (PL(R) pixels) are adjusted in accordance with the abovementioned expression 5.

The result of this processing is output to the parallax detection unit 106 as the gain-adjusted right-eye image 126 depicted in FIG. 18.

[4. Regarding an Embodiment in which Parallax Detection is Carried Out from a Right-Eye Image and a Normal Image, and a Depth Map is Generated (Embodiment 3)]

Next, an embodiment is described in which parallax detection is carried out from a right-eye image and a normal image without generating a left-eye image from the right-eye image and the normal image, and a depth map is generated, as an exemplary modification of the image processing device of the abovementioned Embodiment 2.

The overall configuration in the present Embodiment 3 is the same configuration as the imaging device depicted in FIG. 1(A), the second polarization section 15 and the imaging element 16 have the configuration depicted in FIG. 16 and FIG. 17 described in the abovementioned Embodiment 2, and have a configuration in which horizontal polarization region pixels (PL(R) pixels) and non-polarization region pixels (N pixels) are repeated.

The difference from the abovementioned Embodiment 2 is the configuration of the image processing unit 17. An exemplary configuration of the image processing unit 17 according to the present Embodiment is depicted in FIG. 24.

The difference between the image processing unit 17 depicted in FIG. 24 and the image processing unit 17 depicted in FIG. 18 described in the preceding Embodiment 2 is that the parallax detection-purpose left-eye image generating unit 104 depicted in FIG. 18 is not present in the image processing unit 17 depicted in FIG. 24.

In Embodiment 3, in the parallax detection unit 106, the gain-adjusted right-eye image 126 generated in the parallax detection-purpose right-eye image generating unit 105, and the interpolated image (2D raw image) 122 generated by the non-polarized pixel interpolation processing unit 102 are input, and parallax detection is executed on the basis of these two images to generate the depth map 128.

Other configurations and processing are the same as the aforementioned Embodiment 2.

The parallax detection unit 106 in Embodiment 3, from the gain-adjusted right-eye image 126 generated in the parallax detection-purpose right-eye image generating unit 105, and the interpolated image (2D raw image) 122 generated by the non-polarized pixel interpolation processing unit 102, detects the amount of deviation in the horizontal direction in corresponding pixel locations of each image, and outputs this amount of deviation as a depth map. Methods such as a block matching method in which the sum of the absolute differences of blocks including the pixels is minimized, and dynamic programming in which matching between the same lines of pixels is optimized, are used for the detection of the corresponding locations of the images.

In this Embodiment 3, a depth map is generated with parallax detection being carried out directly from the gain-adjusted right-eye image 126 that is a right-eye image, and the interpolated image (2D raw image) 122 that is a normal image, without generating a left-eye image. As previously mentioned, a normal image is an image produced by adding a right-eye image and a left-eye image, and the parallax between the right-eye image and the normal image corresponds to half of the parallax of the right-eye image and the left-eye image.

Therefore, the parallax detection unit 106 doubles the magnitude of the parallax detected from the gain-adjusted right-eye image 126 that is a right-eye image, and the interpolated image (2D raw image) 122 that is a normal image, and outputs the parallax as the depth map 128.

The processing other than this processing performed by the parallax detection unit 106 is the same as in the aforementioned Embodiment 2.

In this Embodiment 3, there are merits in that the generation processing of the right-eye image for parallax detection can be omitted, and the configuration and processing of the image processing unit are simplified.

[5. Summary of the Configurations of the Present Disclosure]

The configurations of the present disclosure have been described above in detail with reference to specific embodiments. However, it is obvious that a person skilled in the art would be able to implement modifications and substitutions for the embodiments without deviating from the gist of the present disclosure. In other words, the present invention has been disclosed in the form of examples, and should not be interpreted in a limiting manner. In determining the gist of the present invention, the claims section should be taken into consideration.

It should be noted that the technology disclosed in the present description can also adopt configurations such as the following.

(1) An image processing device including:

a first polarization means which has a first polarization region and a second polarization region that each allows different polarized light to be transmitted therethrough;

a second polarization means into which the transmitted light of the first polarization means enters, and which is made up of a third polarization region that allows only the transmitted light of either one of the first polarization region or the second polarization region to be transmitted therethrough, and a total transmission region that allows the transmitted light of the first polarization region and the second polarization region to be transmitted therethrough;

an imaging element into which the transmitted light of the second polarization means is input; and an image processing unit which executes signal processing for an output signal of the imaging element, wherein the image processing unit generates parallax information in which subject distance is reflected by applying a first viewpoint image that is based on the transmitted light of the total transmission region of the second polarization means, and a second viewpoint image that is based on the transmitted light of the third polarization region of the second polarization means, and generates a left-eye-purpose image and a right-eye-purpose image for three-dimensional image display by means of image conversion processing of the first viewpoint image for which the parallax information is applied.

(2) The first viewpoint image that is based on the transmitted light of the total transmission region of the second polarization means is a normal image in which the center location of the first polarization means serves as the viewpoint, the second viewpoint image that is based on the transmitted light of the third polarization region of the second polarization means is a right-eye-purpose image or a left-eye-purpose image in which either one of the gravity center locations of the first polarization region or the second polarization region of the first polarization means serves as the viewpoint, and the image processing unit applies the normal image that is the first viewpoint image and the viewpoint image of either the right-eye-purpose image or the left-eye-purpose image that is the second viewpoint image to generate a left-eye-purpose image or a right-eye-purpose image as a third viewpoint image that is different from the second viewpoint image, and applies the second viewpoint image and the third viewpoint image to generate the parallax information.

(3) The image processing device according to (1) or (2), wherein the image processing unit generates a left-eye-purpose image or a right-eye-purpose image as a third viewpoint image that is different from the second viewpoint image, by means of processing in which a pixel value of the right-eye-purpose image or the left-eye-purpose image that is the second viewpoint image is subtracted from a pixel value of the normal image that is the first viewpoint image.

(4) The image processing device according to any of (1) to (3), wherein the parallax information generated by the image processing unit is a depth map in which the subject distance information of an image is reflected, and the image processing unit generates a left-eye-purpose image and a right-eye-purpose image for three-dimensional image display by means of the image conversion processing of the first viewpoint image in which the depth map is applied.

(5) The image processing device according to any of (1) to (4), wherein the third polarization region and the total transmission region of the second polarization means are configurations that are repeatedly set in multiple-pixel units in a first direction that is one direction of an imaging element plane.

(6) The image processing device according to any of (1) to (5), wherein the third polarization region of the second polarization means is configured of a wire grid polarizer, and is a configuration having wires that extend in a second direction perpendicular to the first direction of the imaging element.

(7) The image processing device according to any of (1) to (6), wherein the image processing unit executes brightness adjustment with which the brightness level of the viewpoint image of either the right-eye-purpose image or the left-eye-purpose image that is the second viewpoint image that is based on the transmitted light of the third polarization region of the second polarization means is made to match the brightness level of the first viewpoint image that is based on the transmitted light of the total transmission region of the second polarization means, and applies the second viewpoint image subsequent to the brightness adjustment to generate the parallax information.

(8) The image processing device according to any of (1) to (7), wherein the image processing unit includes: an interpolation processing unit which interpolates pixel values of pixel locations corresponding to the third polarization region that are not included in an image that is based on imaging element output from the pixel locations of the imaging element corresponding to the total transmission region of the second polarization means; and a demosaic processing unit which sets pixel values for colors to pixel locations by means of demosaic processing of an interpolated image generated by the interpolation processing unit and generates the first viewpoint image, and the image processing unit executes the image conversion processing in which the parallax information is applied, with respect to the first viewpoint image generated by the demosaic processing unit, and generates a left-eye-purpose image and a right-eye-purpose image for three-dimensional image display.

(9) The image processing device according to any of (1) to (8), wherein the image conversion processing executed by the image processing unit is 2D/3D conversion processing with which a left-eye-purpose image and a right-eye-purpose image for three-dimensional image display are generated by means of image conversion processing in which the parallax information is applied with respect to the first viewpoint image, which is a two-dimensional (2D) image.

(10) The image processing device according to any of (1) to (9), wherein the image conversion processing which is executed by the image processing unit and in which the parallax information is applied is 2D/3D conversion processing with which a left-eye-purpose image and a right-eye-purpose image for three-dimensional image display are generated by carrying out image shift processing corresponding to subject distance with respect to the first viewpoint image.

In addition, the method for the processing is executed in the abovementioned devices and so on, and a program that causes the processing to be executed is also included in the configurations of the present disclosure.

Furthermore, the series of processing described in the description can be executed by hardware, software, or a combination of both hardware and software. In the case where processing by means of software is carried out, a program in which a processing sequence is recorded can be installed in a memory in a computer incorporated into dedicated hardware and executed, or a program can be installed in a general-purpose computer capable of executing various types of processing and executed. For example, a program can be recorded in advance on a recording medium. Besides installing a program from a recording medium onto a computer, a program can be received via a network such as a LAN (local area network) and the Internet, and installed on a recording medium such as an internal hard disk.

It should be noted that the variety of types of processing described in the description may be executed not only in a time-series manner in accordance with that described, but may also be executed in parallel or separately in accordance with the processing performance of the device executing the processing or as necessary. Furthermore, in the present description, a system is a logical configuration of a set of a plurality of apparatuses, and the devices of each configuration are not restricted to being in the same enclosure.

INDUSTRIAL APPLICABILITY

As described above, according to the configuration of one embodiment of the present disclosure, it is possible to acquire a plurality of viewpoint images and generate images for three-dimensional image display without causing a reduction in polarization performance.

To be specific, provided are: a first polarization means which has a first polarization region and a second polarization region that each allow different polarized light to be transmitted therethrough; a second polarization means which includes a third polarization region that allows only the transmitted light of either one of the first polarization region or the second polarization region to be transmitted therethrough, and a total transmission region that allows the transmitted light of the first polarization region and the second polarization region to be transmitted therethrough; an imaging element into which the transmitted light of the second polarization means is input; and an image processing unit which executes signal processing for an output signal of the imaging element. The image processing unit generates parallax information in which subject distance is reflected by applying a first viewpoint image that is based on the transmitted light of the total transmission region of the second polarization means, and a second viewpoint image that is based on the transmitted light of the third polarization region of the second polarization means, and generates a left-eye-purpose image and a right-eye-purpose image for three-dimensional image display by means of image conversion processing of the first viewpoint image for which the parallax information is applied.

In accordance with the image processing device of one embodiment of the present disclosure, in a camera device that acquires left and right images for each pixel by a polarization filter for separating light being arranged on an aperture surface of an optical system, and a wire grid polarizer being arranged on an image sensor imaging surface, as a result of arranging only a horizontal-direction wire grid polarizer without requiring a vertical-direction wire grid polarizer, it is possible to realize high polarization separation characteristics even with an image sensor having a small pixel size, and it is possible to maintain parallax resolution performance between the left and right images.

REFERENCE SIGNS LIST

10 Imaging device
11 Photographing lens
12 First polarization section
13 Aperture
14 Image-forming lens
15 Second polarization section
16 Imaging element
17 IMAGE PROCESSING UNIT
18 STORAGE UNIT
51 Polarized pixel separation unit
52 Non-polarized pixel interpolation processing unit
53 Demosaic processing unit
54 Polarized pixel interpolation processing unit
55 Parallax detection unit
56 PARALLAX IMAGE GENERATING UNIT
57 Image output unit
61 N pixel signal (non-polarized pixel signal)
62 Interpolated image (2D raw image)
63 2D-RGB image
65 PL pixel signal (polarized pixel signal)
66 Left-eye/right-eye image signal
67 Depth map
71 Left-eye image (L image)
72 Right-eye image (R image)
81 Differentiator
82 Gain control unit
83 Non-linear conversion unit
84 Image synthesis unit
91 Gain coefficient calculation unit
92 Multiplication processing unit
101 Polarized pixel separation unit
102 Non-polarized pixel interpolation processing unit
103 Demosaic processing unit
104 Parallax detection-purpose left-eye image generating unit
105 Parallax detection-purpose right-eye image generating unit
106 Parallax detection unit
107 PARALLAX IMAGE GENERATING UNIT
108 Image output unit
121 N pixel signal (non-polarized pixel signal)
122 Interpolated image (2D raw image)
123 2D-RGB image
125 PL(R) pixel signal (polarized pixel signal)
126 Gain-adjusted right-eye image
127 Left-eye image
128 Depth map
151 Left-eye image (L image)
152 Right-eye image (R image)

The invention claimed is:

1. An image processing device comprising:
a first polarization means which has a first polarization region and a second polarization region that each allows different polarized light to be transmitted therethrough;
a second polarization means into which the transmitted light of the first polarization means enters, and which is made up of a third polarization region that allows only the transmitted light of either one of the first polarization region or the second polarization region to be transmitted therethrough, and a total transmission region that allows the transmitted light of the first polarization region and the second polarization region to be transmitted therethrough;
an imaging element into which the transmitted light of the second polarization means is input; and
an image processing unit which executes signal processing for an output signal of the imaging element,
wherein the image processing unit generates parallax information in which subject distance is reflected by applying a first viewpoint image that is based on the transmitted light of the total transmission region of the second polarization means, and a second viewpoint image that is based on the transmitted light of the third polarization region of the second polarization means, and generates a left-eye-purpose image and a right-eye-purpose image for three-dimensional image display by means of image conversion processing of the first viewpoint image for which the parallax information is applied.

2. The image processing device according to claim 1, wherein
the first viewpoint image that is based on the transmitted light of the total transmission region of the second polarization means is a normal image in which the center location of the first polarization means serves as a viewpoint,
the second viewpoint image that is based on the transmitted light of the third polarization region of the second polarization means is a right-eye-purpose image or a left-eye-purpose image in which either one of the gravity center locations of the first polarization region, or the second polarization region of the first polarization means serves as the viewpoint, and
The image processing unit:
applies the normal image that is the first viewpoint image and a viewpoint image of either the right-eye-purpose image or the left-eye-purpose image that is the second viewpoint image to generate a left-eye-purpose image or a right-eye-purpose image as a third viewpoint image that is different from the second viewpoint image, and
applies the second viewpoint image and the third viewpoint image to generate the parallax information.

3. The image processing device according to claim 2, wherein
the image processing unit generates the left-eye-purpose image or the right-eye-purpose image as the third viewpoint image that is different from the second viewpoint image, by means of processing in which a pixel value of the right-eye-purpose image or the left-eye-purpose image that is the second viewpoint image is subtracted from a pixel value of the normal image that is the first viewpoint image.

4. The image processing device according to claim 1, wherein
the parallax information generated by the image processing unit is a depth map in which subject distance information of an image is reflected, and
the image processing unit generates the left-eye-purpose image and the right-eye-purpose image for the three-dimensional image display by means of the image conversion processing of the first viewpoint image in which the depth map is applied.

5. The image processing device according to claim 1, wherein the third polarization region and the total transmission region of the second polarization means are configurations that are repeatedly set in multiple-pixel units in a first direction that is one direction of an imaging element plane.

6. The image processing device according to claim 5, wherein the third polarization region of the second polarization means is configured of a wire grid polarizer, and is a configuration having wires that extend in a second direction perpendicular to the first direction of the imaging element.

7. The image processing device according to claim 1, wherein
the image processing unit
executes brightness adjustment with which the brightness level of a viewpoint image of either the right-eye-purpose image or the left-eye-purpose image that is the second viewpoint image that is based on the transmitted light of the third polarization region of the second polarization means is made to match the brightness level of the first viewpoint image that is based on the transmitted light of the total transmission region of the second polarization means, and
applies the second viewpoint image subsequent to the brightness adjustment to generate the parallax information.

8. The image processing device according to claim 1, wherein
the image processing unit includes
an interpolation processing unit which interpolates pixel values of pixel locations corresponding to the third polarization region that are not included in an image that is based on imaging element output from the pixel locations of the imaging element corresponding to the total transmission region of the second polarization means, and
a demosaic processing unit which sets the pixel values for colors to the pixel locations by means of demosaic processing of an interpolated image generated by the interpolation processing unit and generates the first viewpoint image, and
the image processing unit executes the image conversion processing in which the parallax information is applied, with respect to the first viewpoint image generated by the demosaic processing unit, and generates the left-eye-purpose image and the right-eye-purpose image for the three-dimensional image display.

9. The image processing device according to claim 1, wherein
the image conversion processing executed by the image processing unit is 2D/3D conversion processing with which the left-eye-purpose image and the right-eye-purpose image for the three-dimensional image display are generated by the means of image conversion processing in which the parallax information is applied with respect to the first viewpoint image, which is a two-dimensional (2D) image.

10. The image processing device according to claim 1, wherein
the image conversion processing which is executed by the image processing unit and in which the parallax information is applied is 2D/3D conversion processing with which the left-eye-purpose image and the right-eye-purpose image for the three-dimensional image display are generated by carrying out image shift processing corresponding to the subject distance with respect to the first viewpoint image.

11. An image processing device which executes image processing for an image captured by an imaging means, wherein
the imaging means is a configuration which captures an image that is based on the transmitted light of a first polarization means that has a first polarization region and a second polarization region that each allows different polarized light to be transmitted therethrough,
the image processing device inputs a first viewpoint image made up of all of the transmitted light of the first polarization region and the second polarization region, and a second viewpoint image made up of only the transmitted light of either one of the first polarization region or the second polarization region,
generates parallax information in which subject distance is reflected by applying the first viewpoint image and the second viewpoint image, and
generates a left-eye-purpose image and a right-eye-purpose image for three-dimensional image display by means of image conversion processing of the first viewpoint image for which the parallax information is applied.

12. An image processing device comprising:
a first polarization means which has a first polarization region and a second polarization region that each allows different polarized light to be transmitted therethrough;
a second polarization means into which the transmitted light of the first polarization means enters, and which is made up of a third polarization region that allows only the transmitted light of the first polarization region to be transmitted therethrough, a fourth polarization region that allows only the transmitted light of the second polarization region to be transmitted therethrough, and a total transmission region that allows the transmitted light of the first polarization region and the second polarization region to be transmitted therethrough;
an imaging element into which the transmitted light of the second polarization means is input; and
an image processing unit which executes signal processing for an output signal of the imaging element,
wherein the image processing unit applies a viewpoint image that is based on the transmitted light of the total transmission region of the second polarization means, and a viewpoint image that is based on the transmitted light of the fourth polarization region to generate parallax information in which subject distance is reflected, and applies the parallax information to generate a left-eye-purpose image and a right-eye-purpose image for three-dimensional image display by means of image conversion processing of a viewpoint image that is based on the transmitted light of the total transmission region of the second polarization means.

13. An image processing method for executing, in an image processing device, image processing for an image captured by an imaging means, wherein
- the imaging means is a configuration which captures an image that is based on transmitted light of a first polarization means that has a first polarization region and a second polarization region that each allows different polarized light to be transmitted therethrough, and
- in the image processing method, in an image processing unit,
- a first viewpoint image made up of all of the transmitted light of the first polarization region and the second polarization region, and a second viewpoint image made up of only the transmitted light of either one of the first polarization region or the second polarization region are input,
- parallax information in which subject distance is reflected by applying the first viewpoint image and the second viewpoint image is generated, and
- a left-eye-purpose image and a right-eye-purpose image for three-dimensional image display are generated by means of image conversion processing of the first viewpoint image for which the parallax information is applied.

14. A non-transitory computer-readable medium having instructions stored therein, a set of computer-executable instructions for causing a computer to perform steps comprising
- capturing an image that is based on the transmitted light of a first polarization means that has a first polarization region and a second polarization region that each allows different polarized light to be transmitted therethrough, wherein
- a first viewpoint image made up of all of the transmitted light of the first polarization region and the second polarization region, and a second viewpoint image made up of only the transmitted light of either one of the first polarization region or the second polarization region to be input,
- parallax information in which subject distance is reflected by applying the first viewpoint image and the second viewpoint image to be generated, and
- a left-eye-purpose image and a right-eye-purpose image for three-dimensional image display to be generated by means of image conversion processing of the first viewpoint image for which the parallax information is applied.

* * * * *